US011896861B2

(12) United States Patent
Revilla et al.

(10) Patent No.: US 11,896,861 B2
(45) Date of Patent: Feb. 13, 2024

(54) APPARATUS FOR DIVERTING FIRE PROTECTION FLUID DISCHARGED FROM DELUGE NOZZLES

(71) Applicant: Chevron U.S.A. Inc., San Ramon, CA (US)

(72) Inventors: Elmer B. Revilla, Missouri City, TX (US); Ifeanyi F. Oramulu, Richmond, TX (US); Bernard Weng-Keong Leong, The Woodlands, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 290 days.

(21) Appl. No.: 17/167,751

(22) Filed: Feb. 4, 2021

(65) Prior Publication Data

US 2022/0241630 A1 Aug. 4, 2022

(51) Int. Cl.
*A62C 35/68* (2006.01)
*A62C 37/08* (2006.01)

(52) U.S. Cl.
CPC .............. *A62C 35/68* (2013.01); *A62C 37/08* (2013.01)

(58) Field of Classification Search
CPC ................................ A62C 35/68; A62C 37/08
USPC ................................................ 169/13, 16, 91
See application file for complete search history.

(56) References Cited

U.S. PATENT DOCUMENTS 6,315,220 B1 * 11/2001 Grubb .................... F16L 37/48 4/615
6,845,784 B2 * 1/2005 Pasczn k................ A62C 99/00 285/8

* cited by examiner

*Primary Examiner* — Christopher S Kim
(74) *Attorney, Agent, or Firm* — Smith & Woldesenbet Law Group, PLLC

(57) ABSTRACT

A deluge nozzle diversion apparatus can include a collection component having at least one wall that forms a collection cavity, where the collection component has a first end and a second end. The deluge nozzle diversion apparatus can also include an adjustable securing apparatus that is configured to secure the first end of the collection component to a deluge nozzle assembly of a deluge system when the adjustable securing apparatus is in a closed position. The deluge nozzle diversion apparatus can further include a diversion channel coupled to the second end of the collection component, where the diversion channel is adjustable and has a length sufficient to divert a fire protection fluid flowing therethrough to an alternative location. The collection cavity of the collection component can be configured to receive all of the fire protection fluid discharged from a deluge nozzle of the deluge system.

8 Claims, 12 Drawing Sheets

APPARATUS FOR DIVERTING FIRE PROTECTION FLUID DISCHARGED FROM DELUGE NOZZLES

TECHNICAL FIELD

The present application is related to deluge fire protection systems and, more particularly, to apparatus for diverting fire protection fluid discharged from deluge nozzles, such as during testing.

BACKGROUND

Fire protection systems are used in many different applications. For example, commercial office spaces have fire protection systems that includes multiple overhead sprinkler heads that spray water when a sensor (e.g., a smoke detector, a heat detector) takes a measurement that indicates to a controller that a fire has started or is about to start. As another example, in certain industrial applications, a deluge fire protection system can be used to quickly inundate equipment that is at risk of fire with a large quantity of water.

Deluge fire protection systems often have unpressurized dry piping and open sprinkler heads. The system is directly connected to a supply of water or some other fire suppressant. When the system is activated, a deluge valve will release the water to all the open sprinkler heads. The valve is opened when activated by a heat or smoke detection system. Deluge systems are often used in high hazard areas such as oil exploration or production rigs, power plants, aircraft hangars, and chemical plants. These systems are very effective in hazardous areas because they release water or another fire suppressant to all the open sprinkler heads simultaneously. This total flood method douses a fire before it has the chance to grow uncontrollably.

A deluge system offers several advantages over a traditional fire sprinkler system. In a traditional sprinkler system, the pipes are filled with water, and the sprinkler heads are closed. A deluge system is a dry system, which means that there is no fluid in the pipes when the deluge system is idle. As a result, the pipes in a deluge system are not at risk for freezing or similar types of blockage. The pipes of traditional sprinklers can freeze when exposed to cold temperatures because they are filled with water. In addition, a deluge system offers a quicker response to a fire by releasing water through all its open heads at once. A regular sprinkler system with closed heads must activate each sprinkler head individually. Therefore, the deluge system is more effective in high hazard situations.

Some fire protection systems, whether traditional or deluge, undergo testing on occasion to ensure that the various components of the system are working properly. In some instances, as with an offshore field operation, the fluid (e.g., water) used in a deluge system has some component (e.g., salt) that can be harmful to the equipment being protected. As a result, a balance needs to be found between the benefit (or, in some cases, the requirement) of testing a deluge fire protection system to ensure proper operation and the detriment of the protected equipment being damaged as a result of the test.

SUMMARY

In general, in one aspect, the disclosure relates to a deluge nozzle diversion apparatus that can include a collection component having at least one wall that forms a collection cavity, where the collection component has a first end and a second end that is opposite the first end. The deluge nozzle diversion apparatus that can also include an adjustable securing apparatus configured to secure the first end of the collection component to a deluge nozzle assembly of a deluge system when the adjustable securing apparatus is in a closed position. The deluge nozzle diversion apparatus that can further include a diversion channel coupled to the second end of the collection component, where the diversion channel is adjustable and has a length sufficient to divert a fire protection fluid flowing therethrough to an alternative location. The collection cavity of the collection component can be configured to receive all of the fire protection fluid discharged from a deluge nozzle of the deluge system.

In another aspect, the disclosure relates to a system that can include a deluge nozzle assembly having a deluge nozzle and a pipe of a plurality of pipes, where the deluge nozzle has an opening. The system can also include a fire protection fluid and a pumping system that pumps the fire protection fluid through the plurality of pipes and the opening in the deluge nozzle. The system can further include a deluge nozzle diversion apparatus disposed over the deluge nozzle during testing of the deluge nozzle. The deluge nozzle diversion apparatus can include a collection component having at least one wall that forms a collection cavity, where the collection component has a first end and a second end that is opposite the first end, where the deluge nozzle is disposed within the collection cavity, and where the collection cavity of the collection component receives substantially all of the fire protection fluid discharged from the deluge nozzle. The deluge nozzle diversion apparatus can also include an adjustable securing apparatus that secures the first end of the collection component to the deluge nozzle assembly. The deluge nozzle diversion apparatus can further include a diversion channel connected to the second end of the collection component, where the diversion channel is adjustable and has a length sufficient to divert the fire protection fluid flowing therethrough to an alternative location.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DESCRIPTION OF THE INVENTION

Figure 1:
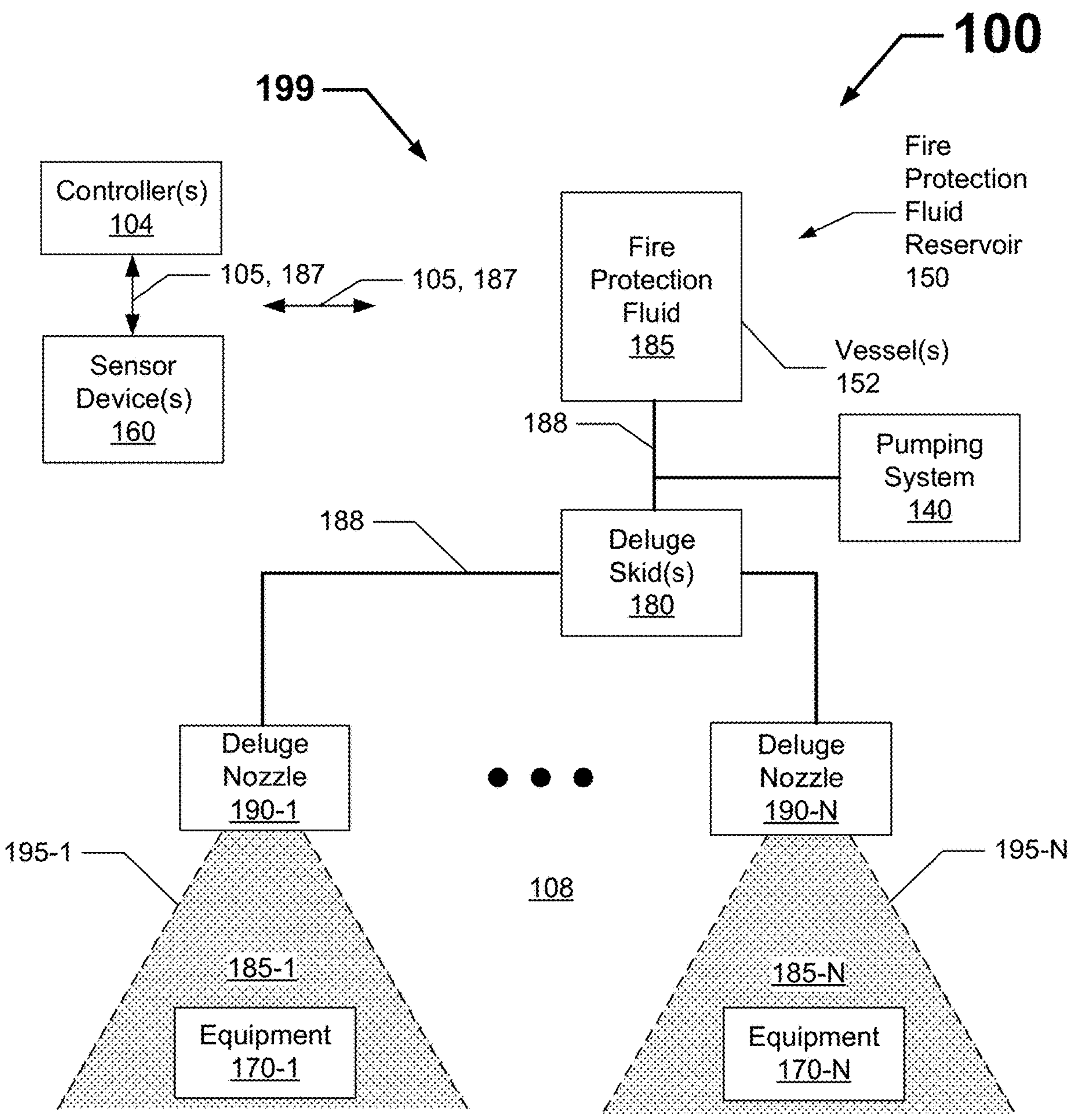
FIG. 1 (Prior Art)
FIG. 1 shows a system that includes a deluge fire protection system in testing mode currently known in the art.

The example embodiments discussed herein are directed to systems, apparatus, methods, and devices for diverting fire protection fluid of deluge fire protection systems during testing. Example embodiments can be used in any location and/or environment in which one or more deluge fire protection systems are used. Examples of such locations can include, but are not limited to, offshore oilfield platforms, chemical plants, electrical power plants, and aircraft hangers. Examples of such environments can include, but are not limited to, hazardous environments, corrosive environments, indoors, outdoors, humid environments, and sub-freezing environments. Example embodiments are reusable.

An example apparatus used for testing a deluge fire protection system includes multiple components that are described herein, where a component can be made from a single piece (as from a mold or an extrusion). When a component (or portion thereof) of an example apparatus used for testing a deluge fire protection system is made from a single piece, the single piece can be cut out, bent, stamped, and/or otherwise shaped to create certain features, elements, or other portions of the component. Alternatively, a component (or portion thereof) of an example apparatus used for testing a deluge fire protection system can be made from multiple pieces that are mechanically coupled to each other. In such a case, the multiple pieces can be mechanically coupled to each other using one or more of a number of coupling methods, including but not limited to adhesives, welding, stitching, zippers, fastening devices, compression fittings, mating threads, and slotted fittings. One or more pieces that are mechanically coupled to each other can be coupled to each other in one or more of a number of ways, including but not limited to fixedly, hingedly, rotatably, removably, slidably, and threadably.

Components and/or features described herein can include elements that are described as coupling, fastening, securing, or other similar terms. Such terms are merely meant to distinguish various elements and/or features within a component or device and are not meant to limit the capability or function of that particular element and/or feature. For example, a feature described as a "coupling feature" can couple, secure, abut against, fasten, and/or perform other functions aside from merely coupling. In addition, each component and/or feature described herein (including each component of an example apparatus used for testing a deluge fire protection system) can be made of one or more of a number of suitable materials, including but not limited to metal (e.g., stainless steel), ceramic, rubber, glass, fibrous material, and plastic.

A coupling feature (including a complementary coupling feature) as described herein can allow one or more components (e.g., a housing) and/or portions of an example apparatus used for testing a deluge fire protection system to become mechanically coupled, directly or indirectly, to another portion of the apparatus used for testing a deluge fire protection system and/or a component of a deluge fire protection system. A coupling feature can include, but is not limited to, a portion of a hinge, an aperture, a recessed area, a protrusion, a slot, a spring clip, a tab, a detent, and mating threads. One portion of an example apparatus used for testing a deluge fire protection system can be coupled to another portion of the apparatus used for testing a deluge fire protection system and/or a component of a deluge fire protection system by the direct use of one or more coupling features.

In addition, or in the alternative, a portion of an example apparatus used for testing a deluge fire protection system can be coupled to another portion of the apparatus used for testing a deluge fire protection system and/or a component of a deluge fire protection system using one or more independent devices that interact with one or more coupling features disposed on a component of the apparatus used for testing a deluge fire protection system. Examples of such devices can include, but are not limited to, a ring, a pin, a hinge, a fastening device (e.g., a bolt, a screw, a rivet), an adapter, and a spring. One coupling feature described herein can be the same as, or different than, one or more other coupling features described herein. A complementary coupling feature as described herein can be a coupling feature that mechanically couples, directly or indirectly, with another coupling feature.

Deluge fire protection systems that use example embodiments while in testing mode can be designed to comply with certain standards and/or requirements. Examples of entities that set such standards and/or requirements can include, but are not limited to, the Society of Petroleum Engineers, the American Petroleum Institute (API), the International Standards Organization (ISO), the National Fire Protection Association (NFPA), and the Occupational Safety and Health Administration (OSHA). Also, as discussed above, an example apparatus used for testing a deluge fire protection system can be used in hazardous environments, and so an example apparatus used for testing a deluge fire protection system can be designed to comply with industry standards that apply to hazardous environments.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three-digit or a four-digit number and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of apparatus used for testing a deluge fire protection system will be described more fully hereinafter with reference to the accompanying drawings, in which example embodiments of apparatus used for testing a deluge fire protection system are shown. Apparatus used for testing a deluge fire protection system may, however, be embodied in many different forms and should not be construed as limited to the example embodiments set forth herein. Rather, these example embodiments are provided so that this disclosure will be thorough and complete, and will fully convey the scope of apparatus used for testing a deluge fire protection system to those of ordinary skill in the art. Like, but not necessarily the same, elements (also sometimes called components) in the various figures are denoted by like reference numerals for consistency.

Terms such as “first”, “second”, “outer”, “inner”, “top”, “bottom”, “above”, “below”, “distal”, “proximal”, “on”, and “within” are used merely to distinguish one component (or part of a component or state of a component) from another. This list of terms is not exclusive. Such terms are not meant to denote a preference or a particular orientation, and they are not meant to limit embodiments of apparatus used for testing a deluge fire protection system. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a system 100 that includes a deluge fire protection system 199 in testing mode currently known in the art. The system 100 includes multiple components. In this case, in addition to the deluge fire protection system 199, the system 100 includes multiple pieces of equipment 170 (e.g., equipment 170-1, equipment 170-N). The deluge fire protection system 199 includes multiple components. As in this case, such components can include a fire protection fluid reservoir 150, a pumping system 140, one or more deluge skids 180, multiple deluge nozzles 190 (e.g., deluge nozzle 190-1, deluge nozzle 190-N), one or more sensor devices 160, and a controller 104.

The components shown in FIG. 1 are not exhaustive, and in some embodiments, one or more of the components shown in FIG. 1 may not be included in the example system 100. Any component of the system 100 can be discrete or combined with one or more other components of the system 100. Also, one or more components of the system 100 can have different configurations. For example, one or more sensor devices 160 can be disposed within or disposed on other components (e.g., the fire protection fluid reservoir 150, a deluge skid 180, the pumping system 140). As another example, the controller 104, rather than being a stand-alone device, can be part of another component (e.g., a deluge skid 180, the pumping system 140) of the system 100.

The fire protection fluid reservoir 150 of the system 100 includes one or more vessels 152 that contain the fire protection fluid 185. A vessel 152 of the fire protection fluid reservoir 150 can be naturally occurring (e.g., a lake bed, a sea bed) or man-made (e.g., metal tank, a concrete basin). A vessel 152 can hold any volume (e.g., 50,000 gallons, 5,000 gallons, 1 million gallons) of the fire protection fluid 185. A vessel 152 of the fire protection fluid reservoir 150 can have one or more of any of a number of characteristics (e.g., shapes, sizes, thicknesses, materials).

The fire protection 185 fluid can have any of a number of different compositions that are naturally occurring or man-made. For example, as when the equipment 170 is located near a body of water (e.g., a lake, an ocean), the body of water can serve as the fire protection fluid 185. As discussed above, there can be times when the composition of the fire protection fluid 185 includes one or more components (e.g., salt) that can cause damage to the equipment 170 when the equipment 170 is deluged with the component. In other words, testing the deluge fire protection system 199 can cause damage to some or all of the equipment 170 in the current art.

The deluge fire protection system 199 can include one or more deluge skids 180 (also sometimes called by other names such as manifolds). Each deluge skid 180 receives the fire protection fluid 185 from one or more of the vessels 152 of the fire protection fluid reservoir 150 and distributes the fire protection fluid 185 to each of the deluge nozzles 190 (e.g., deluge nozzle 190-1, deluge nozzle 190-N) simultaneously. A deluge skid 180 can be a self-contained unit or distributed among the piping 188 throughout the deluge fire protection system 199.

A deluge skid 180 can include multiple components such as piping (e.g., piping 188) and valves. By operating (e.g., fully opening, fully closing) one or more of the valves of the deluge skid 180, the flow of the fire protection fluid 185 can be directed to particular deluge nozzles 190 at a given point in time. A deluge skid 180 can be configured so that its valves can be operated while the fire protection fluid 185 continues to flow, whether during testing (as in FIG. 1) or during an actual emergency that triggers the deluge fire protection system 199.

Each of the deluge nozzles 190 (e.g., deluge nozzle 190-1, deluge nozzle 190-N) is configured to allow the fire protection fluid 185 to flow therethrough in order to deluge the equipment 170 located below the deluge nozzles 190. For example, deluge nozzle 190-1 emits a portion 185-1 of the fire protection fluid 185 to deluge the equipment 170-1. Each deluge nozzle 190 can have any of a number of configurations (e.g., shape, size) and can be made from one or more of any of a number of materials that are suitable for the conditions at the location 108 in which they are located.

Each deluge nozzle 190 is configured to have a range of coverage 195. For example, deluge nozzle 190-1 has a range of coverage 195-1, and deluge nozzle 190-N has a range of coverage 195-N. The range of coverage 195 of a deluge nozzle 190 defines a volume of space within the location 108 that becomes deluged by a portion of the fire protection fluid 185. For example, the range of coverage 195-1 of the deluge nozzle 190-1 defines the volume of space within the location 108 that becomes deluged by the portion 185-1 of the fire protection fluid 185. As another example, the range of coverage 195-N of the deluge nozzle 190-N defines the volume of space within the location 108 that becomes deluged by the portion 185-N of the fire protection fluid 185. The equipment 170-1 is within the range of coverage 195-1 of the deluge nozzle 190-1, and the equipment 170-N is within the range of coverage 195-N of the deluge nozzle 190-N.

In a number of cases, one or more of the deluge nozzles 190 is in a fixed position relative to the deluge skid 180. For example, a deluge nozzle 190, including piping 188 attached to that deluge nozzle 190, cannot be rotated, tilted, or otherwise moved to a different position. As a result, the range of coverage 195 of those deluge nozzles 190 does not and cannot change over time. In such cases, regardless of whether the deluge fire protection system 199 is operated in test mode or in response to an actual fire, the equipment 170 is deluged.

The system 100 can include multiple pieces of equipment 170 (e.g., equipment 170-1, equipment 170-N). Each of the equipment 170 can include one or multiple pieces of equipment. When the equipment 170 (e.g., equipment 170-1) includes multiple pieces of equipment, those multiple pieces can be associated with each other (e.g., part of a common operating system or process) or unassociated with each other (e.g., part of multiple operating systems or processes). Examples of the equipment 170 can include, but is not limited to, a motor, a pump, a fan, a control panel, a sensor device (e.g., sensor device 160), a breaker panel, a switch, a power transfer device (e.g., a transformer, an inverter, a converter), electrical cable, conduit, and a protective relay.

All of the equipment 170 is located in a location 108. The location 108 in which one part (e.g., the equipment 170-1) of the equipment 170 is located can be the same as or different than that which another part (e.g., the equipment 170-N) of the equipment 170 is located. The location 108 can have one or more of a number of characteristics, including but not limited to a hazardous environment, a corrosive environment, indoors, outdoors, a humid environment, and a sub-freezing environment. As discussed above, there can be cases where some or all of the equipment 170 can be adversely affected when deluged by the fire protection fluid 185. These adverse effects can be as a result of the composition of the fire protection fluid 185 and/or the configuration of the equipment 170.

The fire protection fluid 185 (or portions thereof) can be transferred from one component of the system 100 to another component of the system 100 using piping 188. The piping 188 can include multiple pipes, elbows, joints, sleeves, collars, and similar components that are coupled to each other (e.g., using coupling features such as mating threads) to establish a network for transferring the fire protection fluid 185. Each component of the piping 188 can have an appropriate size (e.g., inner diameter, outer diameter) and be made of an appropriate material (e.g., stainless steel) to safely handle the pressure, temperature, flow rate, and other characteristics of the fire protection fluid 185.

The system 100 can include one or more controllers 104 that can control (e.g., operate) one or more components of the system 100, including the deluge fire protection system 199. A controller 104 of the system 100 communicates with and in some cases controls one or more of the other components (e.g., a sensor device 160, the pumping system 140, a deluge skid 180, some or all of the equipment 170) of the system 100. The controller 104 performs a number of functions that include receiving data, evaluating data, following protocols, running algorithms, and sending commands. The controller 104 can include one or more of a number of components. Such components of the controller 104 can include, but are not limited to, a control engine, a communication module, a timer, a counter, a power module, a storage repository, a hardware processor, memory, a transceiver, an application interface, and a security module. When there are multiple controllers 104 (e.g., one controller for the fire protection system 199, another controller for the equipment 170-1), each controller 104 can operate independently of each other. Alternatively, one or more of the controllers 104 can work cooperatively with each other. As yet another alternative, one of the controllers 104 can control some or all of one or more other controllers 104 in the system 100.

Each sensor device 160 includes one or more sensors that measure one or more parameters (e.g., pressure, flow rate, temperature, humidity, smoke). A sensor device 160 can be integrated with or measure a parameter associated with one or more components of the system 100. For example, a sensor device 160 can be configured to measure a parameter (e.g., flow rate, pressure, temperature) of the fire protection fluid 185 flowing through the piping 188 at a particular location (e.g., between the deluge nozzle 190-1 and the deluge skid 180). As another example, a sensor device 160 can be configured to determine a degree to which a valve of a deluge skid 180 is open or closed. As yet another example, a sensor device 160 can be configured to determine whether there is a fire somewhere in the location 108. In some cases, a number of sensors and/or sensor devices 160, each measuring a different parameter, can be used in combination to determine and confirm whether a controller 104 should take a particular action (e.g., operate a valve in the deluge skid 180, control a pump motor of the pumping system 140).

In some cases, a sensor device 160 can be an integrated sensor device 160, which means that the sensor device 160 can include one or more of a number of components in addition to a sensor. Such additional components, can include, but are not limited to, a control engine, a communication module, a timer, a power module, a storage repository, a hardware processor, a memory, a receiver, a transmitter, an application interface, an energy storage device, and a security module. Any component of an integrated sensor device 160 can be discrete, combined with one or more other components of the integrated sensor device 160, shared with a controller 104, and/or shared with another integrated sensor device 160.

Interaction between each controller 104, the sensor devices 160, and other components (e.g., the pumping system 140, a deluge skid 180) of the system 100 can be conducted using communication links 105 and/or power transfer links 187. Each communication link 105 can include wired (e.g., Class 1 electrical cables, Class 2 electrical cables, electrical connectors, Power Line Carrier, RS485) and/or wireless (e.g., Wi-Fi, Zigbee, visible light communication, cellular networking, Bluetooth, WirelessHART, ISA100) technology. A communication link 105 can transmit signals (e.g., communication signals, control signals, data) between each controller 104, the sensor devices 160, and other components of the system 100.

In addition, or in the alternative, one or more components (e.g., the deluge fire protection system 199) of the system 100 (or portions thereof) can be operated manually by a user (e.g., a contractor, an engineer, an operator, an inspector, a maintenance worker, a roughneck), independent of any controller 104. For example, a user can manually operate a valve to activate or deactivate the deluge fire protection system 199 (or portion thereof).

Each power transfer link 187 can include one or more electrical conductors, which can be individual or part of one or more electrical cables. In some cases, as with inductive power, power can be transferred wirelessly using power transfer links 187. A power transfer link 187 can transmit power between each controller 104, the sensor devices 160, and other components of the system 100. Each power transfer link 187 can be sized (e.g., 12 gauge, 18 gauge, 4 gauge) in a manner suitable for the amount (e.g., 480 V, 24 V, 120 V) and type (e.g., alternating current, direct current) of power transferred therethrough.

As discussed above, whenever the deluge fire protection system 199 of the system 100 operates, the fire protection fluid 185 is discharged onto the equipment 170 at the location 108. This is because the deluge nozzles 190 are in a fixed position and cannot be adjusted so that the range of coverage 195 of those deluge nozzles 190 covers the equipment 170. For example, if the fire protection fluid 185 is sea water, the salt content of the sea water causes corrosion, plugging and fouling in the deluge skids 180 (e.g., the piping 180), the deluge nozzles 190, and other process equipment of the deluge fire protection system 199 in an offshore environment. Because of the potential to corrode parts of the deluge fire protection system 199 and create destructive effects on the equipment 170, much of which can be expensive to replace, the deluge fire protection system 199 often goes untested for years, thereby increasing the probability of failure on demand in fire events. To avoid this problem, as shown in FIG. 2 below, one or more example deluge nozzle diversion apparatus 210 can be added to the deluge fire protection system.

Figure 2:
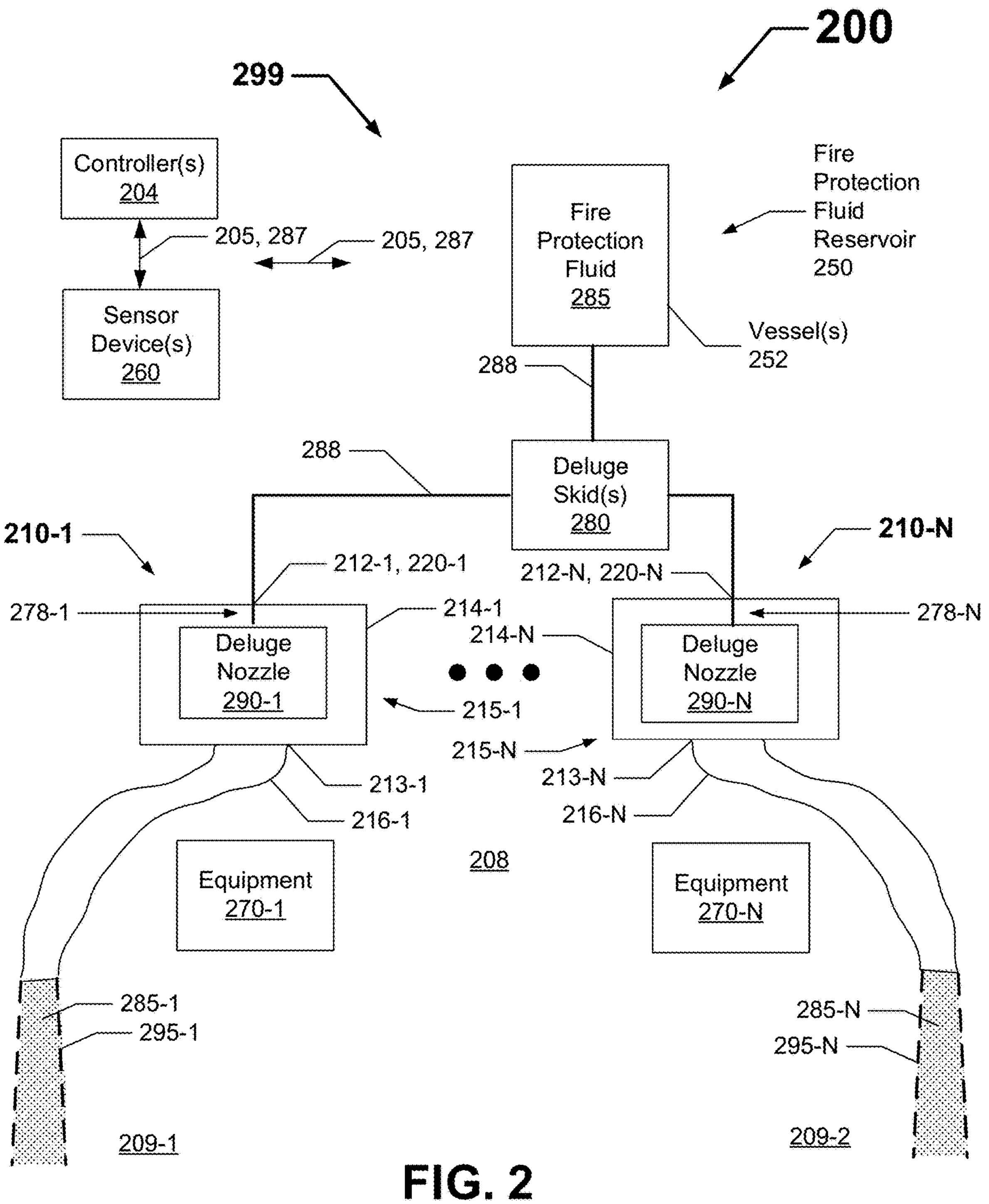
FIG. 2 shows a system that includes a deluge fire protection system in testing mode according to certain example embodiments.

FIG. 2 shows a system 200 that includes a deluge fire protection system 299 in testing mode according to certain example embodiments. Referring to FIGS. 1 and 2, the system 200 of FIG. 2 is substantially the same as the system 100 of FIG. 1, except that the system 200 of FIG. 2 also includes example deluge nozzle diversion apparatus 210. The controllers 206, the sensor modules 260, the fire protection fluid reservoir 250 (including the vessels 252), the fire protection fluid 285, the deluge skid 280, the deluge nozzles 290, the equipment 270, the location 208 (also called the equipment location 208), the communication links 205, the power transfer links 287, and the piping 288 of the system 200 of FIG. 2 are substantially the same as the controllers 106, the sensor modules 160, the fire protection fluid reservoir 150 (including the vessels 152), the fire protection fluid 185, the deluge skid 180, the deluge nozzles 190, the equipment 170, the location 108, the communication links 105, the power transfer links 187, and the piping 188 of the system 100 of FIG. 1.

As discussed above, the system 200 (and so also the deluge fire protection system 299) can include multiple example deluge nozzle diversion apparatus 210 in a number that equals the number of deluge nozzles 290. In this case, there are N deluge nozzle diversion apparatus 210 that includes deluge nozzle diversion apparatus 210-1 and deluge nozzle diversion apparatus 210-N. Each deluge nozzle diversion apparatus 210 is disposed over (e.g., covers, is engaged with) a deluge nozzle 290. In this example, the deluge nozzle diversion apparatus 210-1 is disposed over the deluge nozzle 290-1, and the deluge nozzle diversion apparatus 210-N is disposed over the deluge nozzle 290-N. When there are multiple deluge nozzle diversion apparatus 210, as in this case, one deluge nozzle diversion apparatus 210 (e.g., deluge nozzle diversion apparatus 210-1) can be configured the same as, or differently than, one or more of the other deluge nozzle diversion apparatus 210 (e.g., deluge nozzle diversion apparatus 210-N) in the system 200. In some cases, the deluge fire protection system 299 system 200 can have only a single deluge nozzle diversion apparatus 210 (as during a test of the deluge fire protection system 299) and a single deluge nozzle 290 that is engaged by the deluge nozzle diversion apparatus 210.

Each deluge nozzle diversion apparatus 210 has multiple components. In this case, each deluge nozzle diversion apparatus 210 includes a diversion channel 216, a collection component 215, and an adjustable securing apparatus 220. For example, the deluge nozzle diversion apparatus 210-1 includes a diversion channel 216-1, a collection component 215-1, and an adjustable securing apparatus 220-1. As another example, the deluge nozzle diversion apparatus 210-N includes a diversion channel 216-N, a collection component 215-N, and an adjustable securing apparatus 220-N. In certain example embodiments, each component of a deluge nozzle diversion apparatus 210, as well as transitions between adjacent components of the deluge nozzle diversion apparatus 210, are waterproof and/or otherwise configured to prevent the fire protection fluid 285 from leaking therethrough.

Each adjustable securing apparatus 220 of a deluge nozzle diversion apparatus 210 is configured to secure an end 212 (also sometimes called a top end 212, a first end, or a proximal end 212) of the collection component 215 over a deluge nozzle 290 of the deluge system 299. The adjustable securing apparatus 220 can have a closed position and an open position. When the adjustable securing apparatus 220 is in the closed position, the adjustable securing apparatus 220 secures the end 212 of the collection component 215 above the head of a deluge nozzle 290. When the adjustable securing apparatus 220 is in the open position, the adjustable securing apparatus 220 and the collection component 215 are able to be inserted over or removed from covering a deluge nozzle 290.

In some cases, the adjustable securing apparatus 220 can have a range of closed positions (e.g., fully closed, 1/32 open) and a range of open positions (e.g., fully open, 3/4 open). In such cases, when the adjustable securing apparatus 220 is in any of the open positions (i.e., not in any of the closed positions), the adjustable securing apparatus 220 is unable to maintain the collection component 215 of the deluge nozzle diversion apparatus 210 over the deluge nozzle 290 during testing of the deluge system 299. In other words, when the adjustable securing apparatus 220 is in an open position, the force that the fire protection fluid 285 applies to the wall 214 of the collection component 215 of the deluge nozzle diversion apparatus 210 during testing of the deluge system 299 overcomes the force that the adjustable securing apparatus 220 applies to the piping 288 to keep the deluge nozzle 290 within the collection cavity formed by the collection component 215 of the deluge nozzle diversion apparatus 210.

Conversely, when the adjustable securing apparatus 220 is in any of the closed positions (i.e., not in any of the open positions), the adjustable securing apparatus 220 maintains the collection component 215 of the deluge nozzle diversion apparatus 210 over the deluge nozzle 290 during testing of the deluge system 299. In other words, when the adjustable securing apparatus 220 is in a closed position, the force that the fire protection fluid 285 applies to the wall 214 of the collection component 215 of the deluge nozzle diversion apparatus 210 during testing of the deluge system 299 is unable to overcome the force that the adjustable securing apparatus 220 applies to the piping 288 to keep the deluge nozzle 290 within the collection cavity formed by the collection component 215 of the deluge nozzle diversion apparatus 210.

An adjustable securing apparatus 220 is not necessarily designed to create a water-tight seal between the top end 212 of the collection component 215 and the piping 288 adjacent to the deluge nozzle 290. Rather, an adjustable securing apparatus 220 can be designed to secure the collection component 215 over the deluge nozzle 290 during testing of the deluge system 299, diverting the vast majority of the fire protection fluid through the diversion channel 216 to an alternative location 209, while still allowing a relatively small amount of fire protection fluid 285 to fall onto the equipment 270 in the equipment location 208. For example, when the adjustable securing apparatus 220 has a range of closed positions, some amount of fire protection fluid 285 is more likely to escape between the piping 288 and the top end 212 of the collection component 215 of the deluge nozzle diversion apparatus 210 during testing of the deluge system 299 as the adjustable securing apparatus 220 approaches the range of open positions.

An adjustable securing apparatus 220 can have any of a number of different configurations and include any of a number of different features. Examples of some adjustable securing apparatus 220 can be found in FIGS. 3 through 4B and 6A through 7 below. An adjustable securing apparatus 220 can be integrated with the end 212 of the collection component 215. Alternatively, the adjustable securing apparatus 220 can be a separate piece that is placed over the end 212 of the collection component 215 to secure the end 212 of the collection component 215 against piping 288 adjacent to and above a deluge nozzle 290. A deluge nozzle diversion apparatus 210 can have one or multiple adjustable securing apparatus 220.

The combination of the deluge nozzle 290 and the adjacent pipe 288 can be referred to as a deluge nozzle assembly 278. For example, deluge nozzle assembly 278-1 includes the deluge nozzle 290-1 and the adjacent pipe 288 that is coupled to the deluge nozzle 290-1. Also, deluge nozzle assembly 278-N includes the deluge nozzle 290-N and the adjacent pipe 288 that is coupled to the deluge nozzle 290-N. A deluge nozzle assembly 278 can include one or more of any of a number of other components, including but not limited to a collar, an elbow, a sleeve, a flow meter, a regulator, and a flow reducer.

The collection component 215 of each deluge nozzle diversion apparatus 210 is configured to receive and channel the fire protection fluid 285 discharged from a deluge nozzle 290 of the deluge system 299. The collection component 215 of a deluge nozzle diversion apparatus 210 can have any of a number of configurations (e.g., shape, size, material). For example, each collection component 215 can be funnel-shaped. The collection component 215 can have multiple components or portions. For example, the collection component 215 can have at least one wall 214 (also called a body 214 herein), the top end 212, and an end 213 (also sometimes called a bottom end 212, a second end, or a distal end 212). In this example, the collection component 215-1 has at least one wall 214-1, a top end 212-1, and a bottom end 213-1, and the collection component 215-N has at least one wall 214-N, a top end 212-N, and a bottom end 213-N.

The top end 212 of each collection component 215 engages a portion (e.g., a deluge nozzle 290, a pipe 288 coupled to the deluge nozzle 290) of a deluge nozzle assembly 278 with the assistance of an adjustable securing apparatus 220. When this occurs, the deluge nozzle 290 (or at least the deluge end thereof) is disposed within a cavity (also sometimes called a collection cavity herein) formed by the wall 214. In this example, deluge nozzle 290-1 is disposed within the collection cavity formed by the wall 214-1 of the collection component 215-1 when the top end 212-1 of the collection component 215-1, with assistance from the adjustable securing apparatus 220-1 in a closed position, is disposed around the deluge nozzle assembly 278-1.

Similarly, deluge nozzle 290-N (or at least the deluge end thereof) is disposed within the collection cavity formed by the wall 214-N of the collection component 215-N when the top end 212-N of the collection component 215-N, with assistance from the adjustable securing apparatus 220-N in a closed position, is disposed around the deluge nozzle assembly 278-N. The top end 212 of a collection component 215 can be part of the wall 214 of the collection component 215. Alternatively, the top end 212 of a collection component 215 can be a separate component of the collection component 215 that is coupled (e.g., sewn, riveted, adhered) to the wall 214.

The one or more walls 214 of a collection component 215 forms a collection cavity that is configured to collect the fire protection fluid 285 as it exits the deluge nozzle 290 disposed within the collection cavity. The collection cavity formed by the one or more walls 214 of the collection component 215 is also configured to funnel the fire protection fluid 285 toward the bottom end 213 of the collection component 215. As a result, substantially all of the fire protection fluid 285 discharged from the deluge nozzle 290 flows into the collection component 215 rather than onto the equipment 270 at the location 208. In certain example embodiments, the at least one wall 214 is made of flexible material that allows the at least one wall 214 to alter its shape to better perform its functions of collecting and funneling the fire protection fluid 285 while allowing the top end 212, with the aid of the adjustable securing apparatus 220, to engage the deluge nozzle assembly 278. In alternative embodiments, the at least one wall 214 is made of rigid material that can be extended, rotated, and/or otherwise manipulated to allow for collecting and funneling the fire protection fluid 285.

The bottom end 213 of a collection component 215 provides a transition between the at least one wall 214 of the collection component 215 and the diversion channel 216. When this occurs, the fire protection fluid 285, funneled by the at least one wall 214 of the collection component 215, flows into the diversion channel 216 without spilling on the equipment 270 at the location 208. In this example, the bottom end 213-1 provides a transition between the wall 214-1 of the collection component 215-1 and the diversion channel 216-1. Similarly, the bottom end 213-N provides a transition between the wall 214-N of the collection component 215-N and the diversion channel 216-N. The bottom end 213 of a collection component 215 can be part of the wall 214 of the collection component 215. Alternatively, the bottom end 213 of a collection component 215 can be a separate component of the collection component 215 that is coupled (e.g., sewn, riveted, adhered) to the wall 214.

Each diversion channel 216 diverts the fire protection fluid 285 flowing therethrough to an alternative location 209 that is separate from the location 208 where the equipment 270 is located. In this example, the diversion channel 216-1, coupled to or integrated with the collection component 215-1, diverts the portion 285-1 of the fire protection fluid 285 to the alternative location 209-1 and away from the equipment location 208 in which the equipment 270-1 is located. Similarly, the diversion channel 216-N, coupled to or integrated with the collection component 215-N, diverts the portion 285-N of the fire protection fluid 285 to the alternative location 209-N and away from the equipment location 208 in which the equipment 270-N is located.

A diversion channel 216 can have any length, can be made of any material that does not allow a significant amount of fire protection fluid 285 to leak therethrough, and can be adjustable in some way so that the fire protection fluid 285 flowing through the diversion channel 216 ends up at an alternative location 209. For example, a diversion channel 216 can be a flexible fire hose that can have a distal end be moved while the proximal end is secured to the collection component over a deluge nozzle 290. As another example, a diversion channel 216 can be a metal tube that has a number (e.g., one, five, ten) of rotatable joints that allow the diversion channel 216 to direct the fire protection fluid 285 toward an alternative location 209. A diversion channel 216 can be a single piece or multiple pieces that are coupled to each other.

Each diversion channel 216 is configured to have a range of coverage 295. For example, the diversion channel 216-1 has a range of coverage 295-1, and the diversion channel 216-N has a range of coverage 295-N. The range of coverage 295 of a diversion channel 216 defines a volume of space within the alternative location 209 that becomes deluged by a portion of the fire protection fluid 285. For example, the range of coverage 295-1 of the diversion channel 216-1 defines the volume of space within the alternative location 209 that becomes deluged by the portion 285-1 of the fire protection fluid 285. As another example, the range of coverage 295-N of the diversion channel 216-N defines the volume of space within the alternative location 209 that becomes deluged by the portion 285-N of the fire protection fluid 285. The equipment 270-1 is outside the range of coverage 295-1 of the diversion channel 216-1, and the equipment 270-N is outside the range of coverage 295-N of the diversion channel 216-N.

Figure 3:
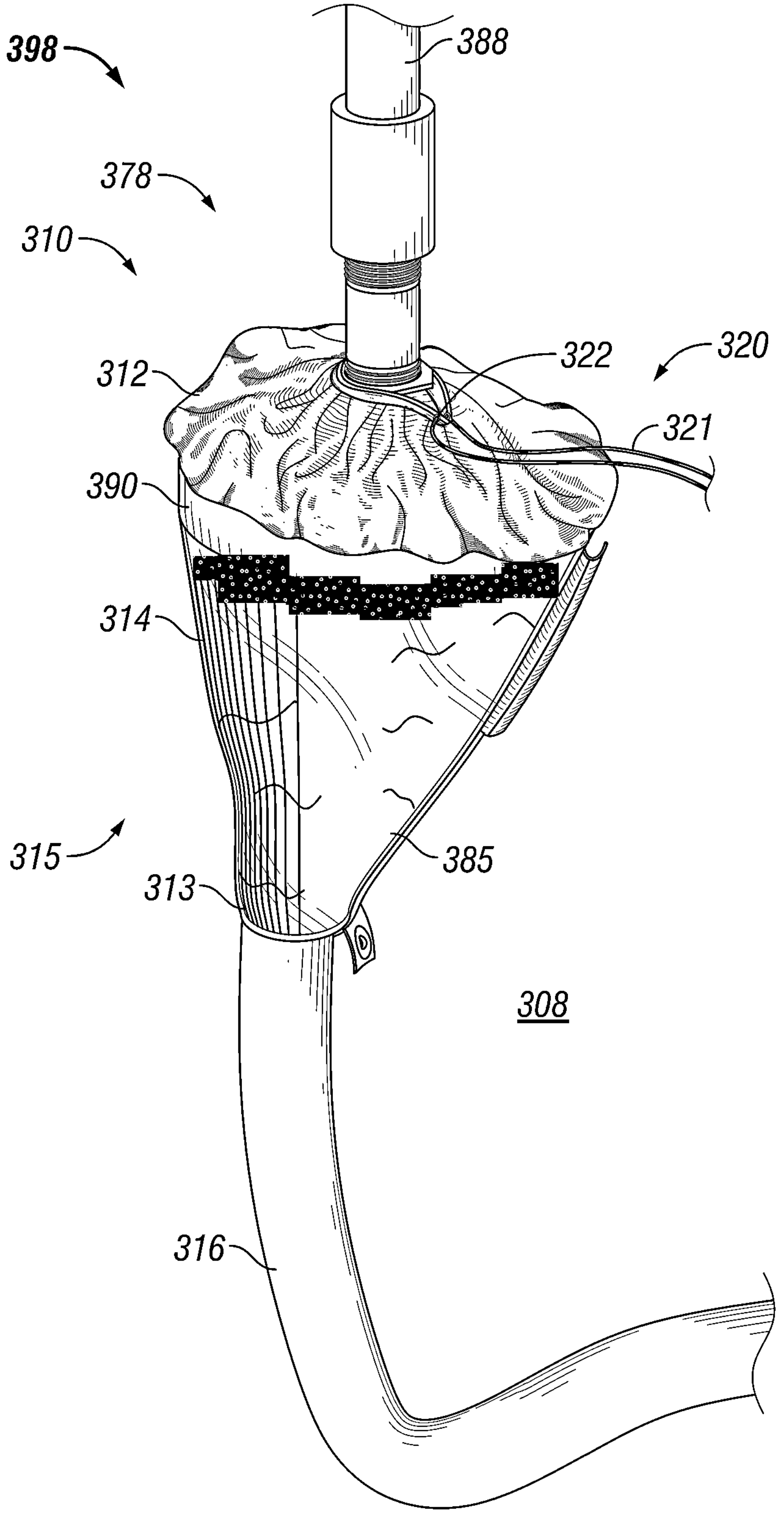
FIG. 3 shows a portion of a deluge fire protection system according to certain example embodiments.

FIG. 3 shows a portion 398 of a deluge fire protection system according to certain example embodiments. Referring to FIGS. 1 through 3, the portion 398 of the deluge fire protection system of FIG. 3 includes a deluge nozzle diversion apparatus 310 that covers a deluge nozzle 390 to divert fire protection fluid 385 from an equipment location 308 to an alternative location (not shown in FIG. 3). The various components (e.g., the collection component 215, the deluge nozzle 390) of the portion 398 of the deluge fire protection system of FIG. 3 are substantially the same as the corresponding components of the system 200 of FIG. 2 above.

In this example, the wall 314 of the collection component 315 of the deluge nozzle diversion apparatus 310 is funnel-shaped (wider at the top end 312 and narrower at the bottom end 313) and is made of a transparent material, which allows the deluge nozzle 390 and the fire protection fluid 385 to be seen within the collection cavity formed by the wall 314. The wall 314 of the collection component 315 of the deluge nozzle diversion apparatus 310 is also flexible and/or otherwise adjustable, which allows the adjustable securing apparatus 320 (described below), integrated with the top end 312, to secure the top end 312 of the collection component 315 to the deluge nozzle assembly 378 (in this case, the deluge nozzle 390 and the pipe 388 connected to the deluge nozzle 390) when the adjustable securing apparatus 320 is in a closed position.

In this case, the adjustable securing apparatus 320 includes a drawstring 321 that is partially disposed within a channel in the top end 312 (in this case made of a nylon material), that traverses a pair of ring-bordered apertures 322 in the top end 312, and that is partially exposed to the ambient environment so that the two ends of the drawstring 321 can be pulled. When the drawstring 321 of the adjustable securing apparatus 320 is pulled a minimal amount (e.g., a minimal amount of the drawstring 321 is exposed to the ambient environment) and the position is maintained (e.g., by a clip, by tying a knot), the adjustable securing apparatus 320 is put in a closed position and secures the top end 312 of the deluge nozzle diversion apparatus against the deluge nozzle assembly 378. When a tension or pulling force is maintained on the drawstring 321 (put another way, the adjustable securing apparatus 320 maintains a closed position), the top end 312 continues to be secured against the deluge nozzle assembly 378, which includes the deluge nozzle 390 and the pipe 388 coupled to the deluge nozzle 390. In this case, the top end 312 of the deluge nozzle diversion apparatus 310 is secured to the top of the deluge nozzle 390 by the adjustable securing apparatus 320.

In order to remove the deluge nozzle diversion apparatus 310 (and so stop the wall 314 of the deluge nozzle diversion apparatus 310 from enclosing the deluge nozzle 390), the tension or pulling force on the drawstring 321 can be reduced or eliminated, thereby allowing the opening at the top end 312 to expand to the point of exceeding the size of the outer perimeter of the deluge nozzle 390. In other words, adjusting the adjustable securing apparatus 320 from a closed position to an open position allows the opening at the top end 312 to become larger than the outer perimeter of the deluge nozzle 390.

The diversion channel 316 of the deluge nozzle diversion apparatus 310 is coupled (e.g., stitched, zipped) to the bottom end 313 of the collection component 315 and provides a flow path for the fire protection fluid 385 from the collection component 315 of the deluge nozzle diversion apparatus 310. The diversion channel 316 is flexible and/or otherwise adjustable. Further, the diversion channel 316 has a length sufficient to divert a fire protection fluid 385 flowing therethrough to an alternative location that is different than the location 308 below the deluge nozzle 390.

Figure 4A:
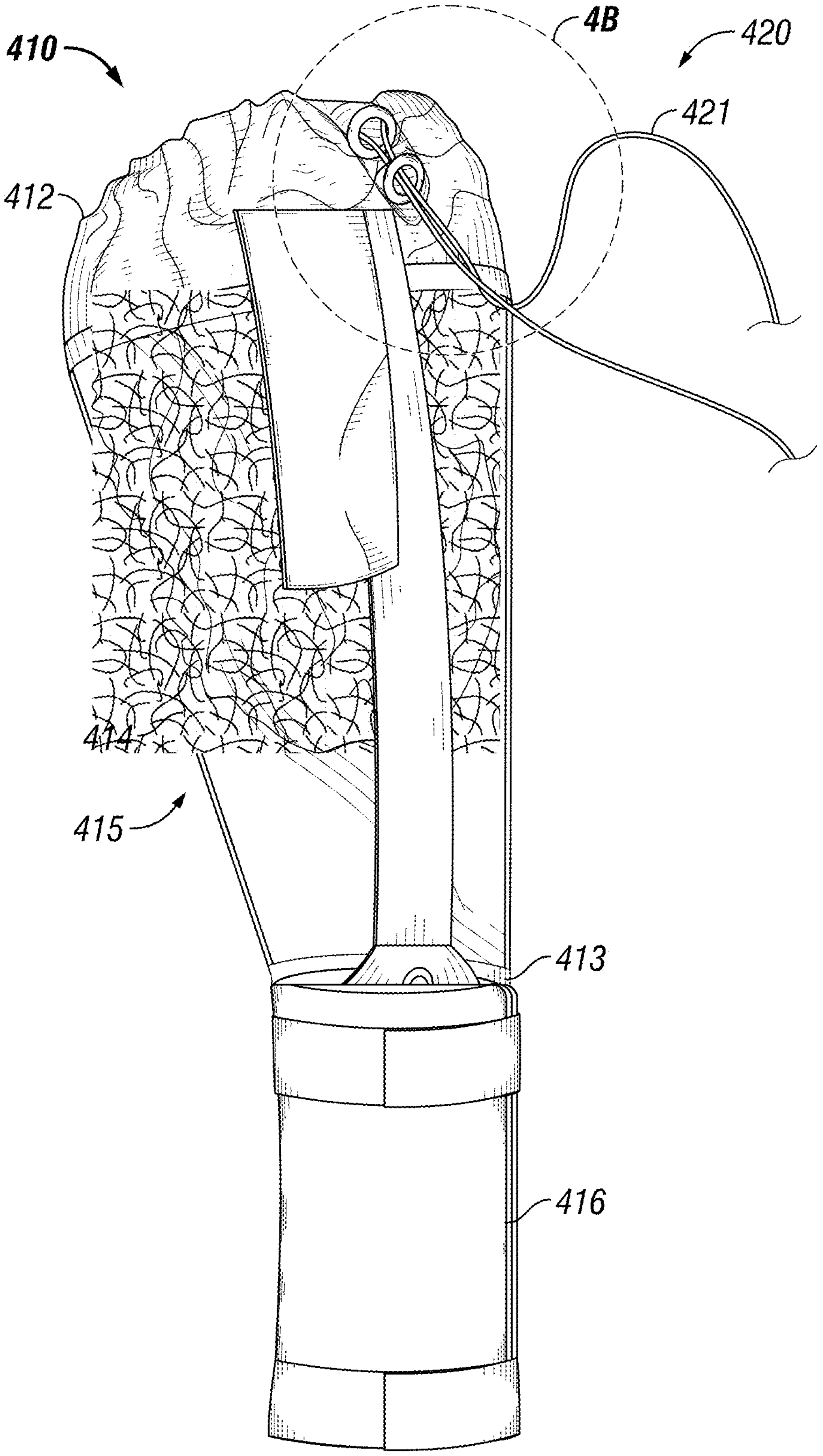
FIGS. 4A and 4B show a deluge nozzle diversion apparatus according to certain example embodiments.
Figure 4B:
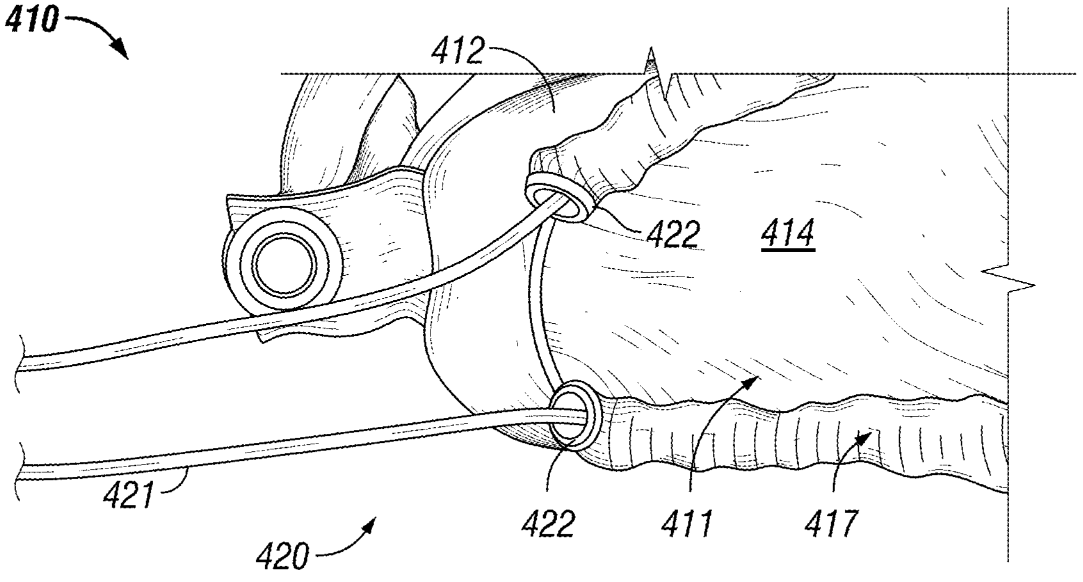

FIGS. 4A and 4B show a deluge nozzle diversion apparatus 410 according to certain example embodiments. Specifically, FIG. 4A shows a perspective view of the deluge nozzle diversion apparatus 410, and FIG. 4B shows a detailed view of part of the deluge nozzle diversion apparatus 410. Referring to FIGS. 1 through 4B, the deluge nozzle diversion apparatus 410 and its components (e.g., the top end 412, the wall 414, the diversion channel 416) are substantially the same as the deluge nozzle diversion apparatus and their corresponding components discussed above.

The deluge nozzle diversion apparatus 410 of FIGS. 4A and 4B is similar to the deluge nozzle diversion apparatus 310 of FIG. 3 above. For example, the wall 414 of the collection component 415 of the deluge nozzle diversion apparatus 410 of FIGS. 4A and 4B is funnel-shaped (wider at the top end 412 and narrower at the bottom end 413) and is made of a transparent material. The wall 414 of the collection component 415 of the deluge nozzle diversion apparatus 410 forms a collection cavity 411 and is also flexible and/or otherwise adjustable, which allows an adjustable securing apparatus 420 (described below), integrated with the top end 412, to secure the top end 412 of the collection component 415 over a deluge nozzle assembly when the adjustable securing apparatus 420 is in a closed position.

In this case, the adjustable securing apparatus 420 includes a drawstring 421 that is partially disposed within a channel in the top end 412 (in this case made of a nylon material), that traverses a pair of ring-bordered apertures 422 in the top end 412, and that is partially exposed to the ambient environment so that the two ends of the drawstring 421 can be pulled. When the drawstring 421 of the adjustable securing apparatus 420 is pulled a minimal amount (e.g., a minimal amount of the drawstring 421 is exposed to the ambient environment) and the position is maintained (e.g., by a clip, by tying a knot), the adjustable securing apparatus 420 is put in a closed position and secures the top end 412 against the deluge nozzle assembly (e.g., the outer surface of the top of the deluge nozzle). When a tension or pulling force is maintained on the drawstring 421 (put another way, the adjustable securing apparatus 420 maintains a closed position), the top end 412 continues to be secured against the deluge nozzle assembly.

In order to remove the deluge nozzle diversion apparatus 410 (and so stop the wall 414 of the deluge nozzle diversion apparatus 410 from enclosing the deluge nozzle), the tension or pulling force on the drawstring 421 can be reduced or eliminated, thereby allowing the opening 417 at the top end 412 to expand to the point of exceeding the size of the outer perimeter of the deluge nozzle. In other words, adjusting the adjustable securing apparatus 420 from a closed position to an open position allows the opening 417 at the top end 412 to become larger than the outer perimeter of the deluge nozzle.

The diversion channel 416 of the deluge nozzle diversion apparatus 410 is coupled (e.g., stitched, zipped, snapped) to the bottom end 413 of the collection component 415 and provides a flow path for fire protection fluid from the collection cavity 411 of the collection component 415 of the deluge nozzle diversion apparatus 410. The diversion channel 416 is adjustable (e.g., flexible) and has an expandable length (e.g., be made of an expandable material, have one or more additional pieces that can be coupled together to increase the length) sufficient to divert a fire protection fluid flowing therethrough to an alternative location.

Figure 5A:
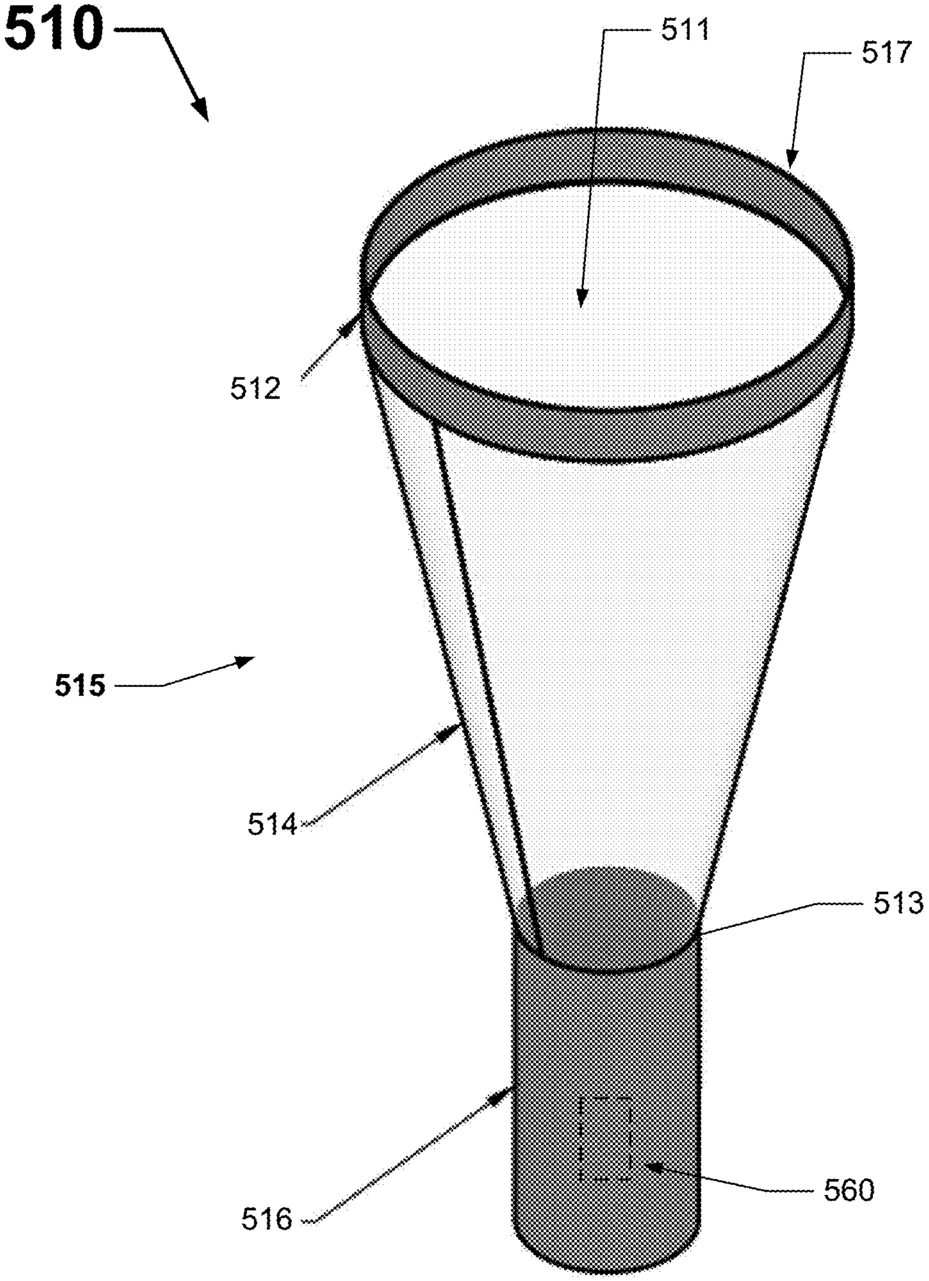
FIGS. 5A and 5B show another deluge nozzle diversion apparatus according to certain example embodiments.
Figure 5B:
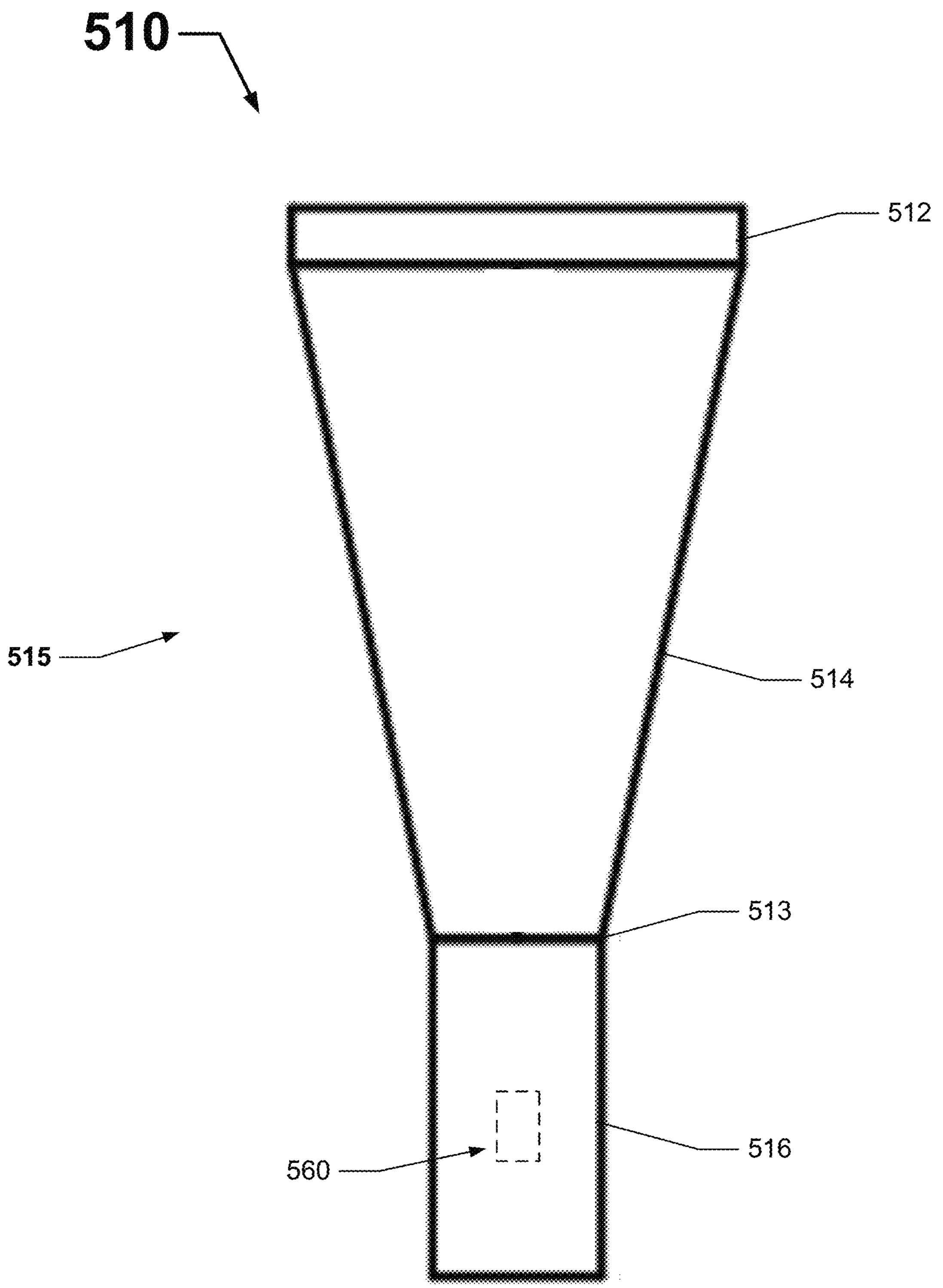

FIGS. 5A and 5B show another deluge nozzle diversion apparatus 510 according to certain example embodiments. Specifically, FIG. 5A shows a perspective view of the deluge nozzle diversion apparatus 510, and FIG. 5B shows a side view of the deluge nozzle diversion apparatus 510. Referring to FIGS. 1 through 5B, the deluge nozzle diversion apparatus 510 and its components (e.g., the top end 512, the wall 514, the diversion channel 516) are substantially the same as the deluge nozzle diversion apparatus and their corresponding components discussed above.

The deluge nozzle diversion apparatus 510 of FIGS. 5A and 5B is similar to the deluge nozzle diversion apparatus 310 of FIG. 3 and the deluge nozzle diversion apparatus 410 of FIGS. 4A and 4B above, except as described below. For example, the wall 514 of the collection component 515 of the deluge nozzle diversion apparatus 510 of FIGS. 5A and 5B is funnel-shaped (wider at the top end 512 and narrower at the bottom end 513) and is made of a transparent material. The wall 514 of the collection component 515 of the deluge nozzle diversion apparatus 510 forms a collection cavity 511 and is also flexible and/or otherwise adjustable, which allows the adjustable securing apparatus (not shown in FIGS. 5A and 5B), disposed over the top end 512, to secure the top end 512 of the collection component 515 against a deluge nozzle assembly (e.g., deluge nozzle assembly 278) when the adjustable securing apparatus is in a closed position.

Figure 6A:
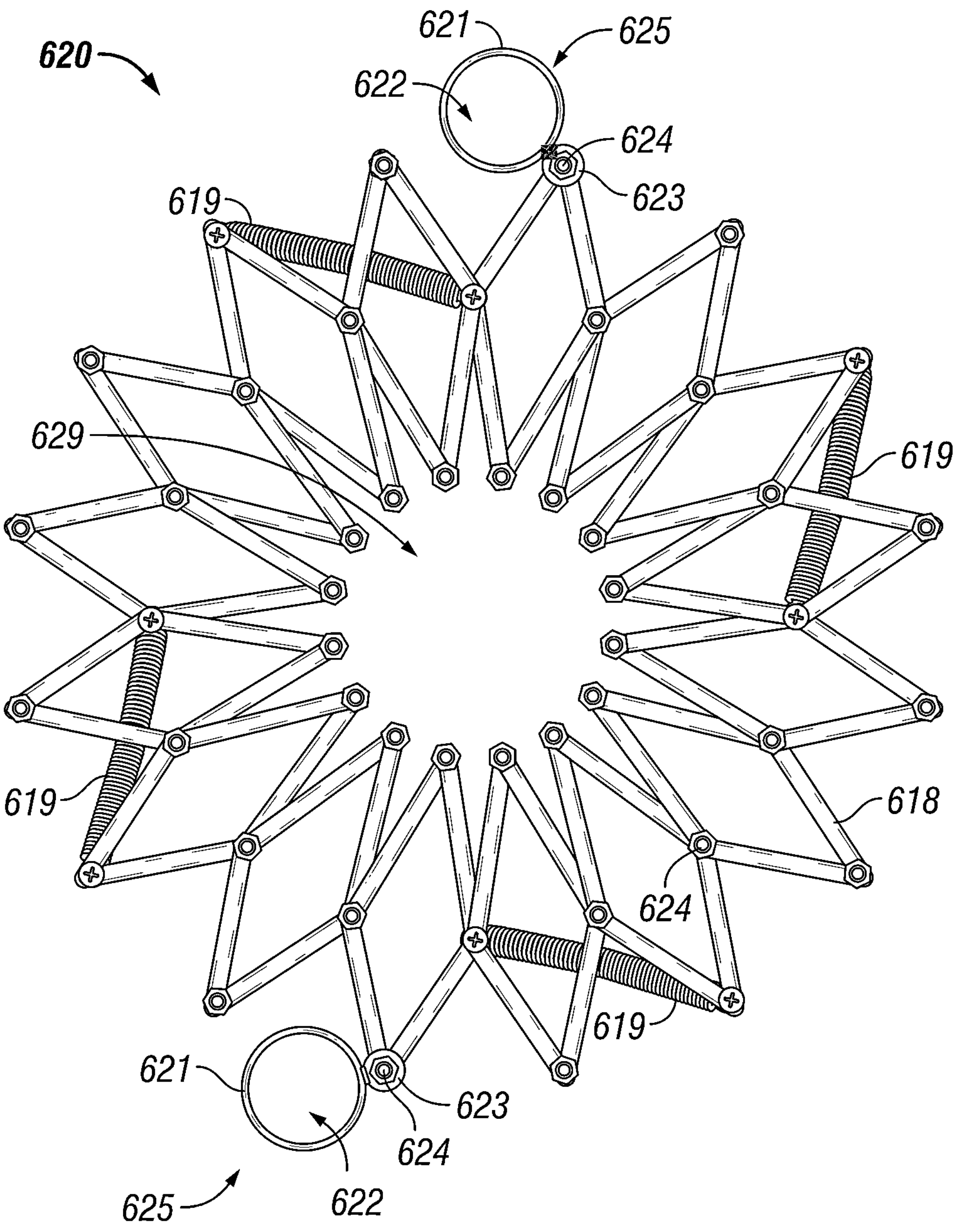
FIGS. 6A and 6B show an adjustable securing apparatus of a deluge fire protection system according to certain example embodiments.

In this case, the adjustable securing apparatus is a separate piece that is not integrated with the top end 512 of the collection component 515. Examples of such a securing apparatus are shown in FIGS. 6A through 7 below. The top end 512 of the collection component 515 in this case is made of a nylon material. When the adjustable securing apparatus is placed over the top end 512 (with the top end 512 placed over a portion of a deluge nozzle assembly) and adjusted to a closed position, the top end 512 is secured against the outer surface of a portion of the deluge nozzle assembly. As long as the adjustable securing apparatus is maintained in a closed position, the top end 512 continues to be secured against the deluge nozzle assembly.

In order to remove the deluge nozzle diversion apparatus 510 (and so stop the wall 514 of the deluge nozzle diversion apparatus 510 from enclosing the deluge nozzle), the adjustable securing apparatus is moved to an open position, thereby allowing the opening 517 at the top end 512 to expand to the point of exceeding the size of the outer perimeter of the deluge nozzle. In other words, adjusting the adjustable securing apparatus from a closed position to an open position allows the opening 517 at the top end 512 to become larger than the outer perimeter of the deluge nozzle.

The diversion channel 516 of the deluge nozzle diversion apparatus 510 is coupled (e.g., stitched, zipped, snapped) to the bottom end 513 of the collection component 515 and provides a flow path for fire protection fluid from the collection cavity 511 of the collection component 515 of the deluge nozzle diversion apparatus 510. The diversion channel 516 is adjustable (e.g., flexible) and has an expandable length (e.g., be made of an expandable material, have one or more additional pieces that can be coupled together to increase the length) sufficient to divert a fire protection fluid flowing therethrough to an alternative location.

In certain example embodiments, as in this case, the deluge nozzle diversion apparatus 510 can include one or more sensor devices 560 to measure one or more parameters associated with fire protection fluid (e.g., fire protection fluid 285) during testing of the deluge fire protection system (e.g., deluge fire protection system 299). In such a case, each sensor device 560 can be an integrated sensor device 560, substantially similar to the integrated sensor devices discussed above with respect to FIGS. 1 and 2. As a result, the sensor device 560 can measure one or more parameters (e.g., the flow rate of the fire protection fluid 285, the pressure at a deluge nozzle 290) as well as communicate (e.g., using a control engine, communication module, and transmitter of the integrated sensor device 560) the measurements, directly or indirectly, using one or more communication links (e.g., communication links 205) to a user.

When the deluge nozzle diversion apparatus 510 includes a sensor device 560, the sensor device 560 can be integrated with any component of the deluge nozzle diversion apparatus 510. For example, as in this case, the sensor device 560 is integrated with the diversion channel 516. As another example, a sensor device 560 can be integrated with some portion (e.g., the top end 512, the wall 514) of the collection component 515. As yet another example, a sensor device 560 can be integrated with the securing apparatus (e.g., securing apparatus 620 below).

Figure 6B:
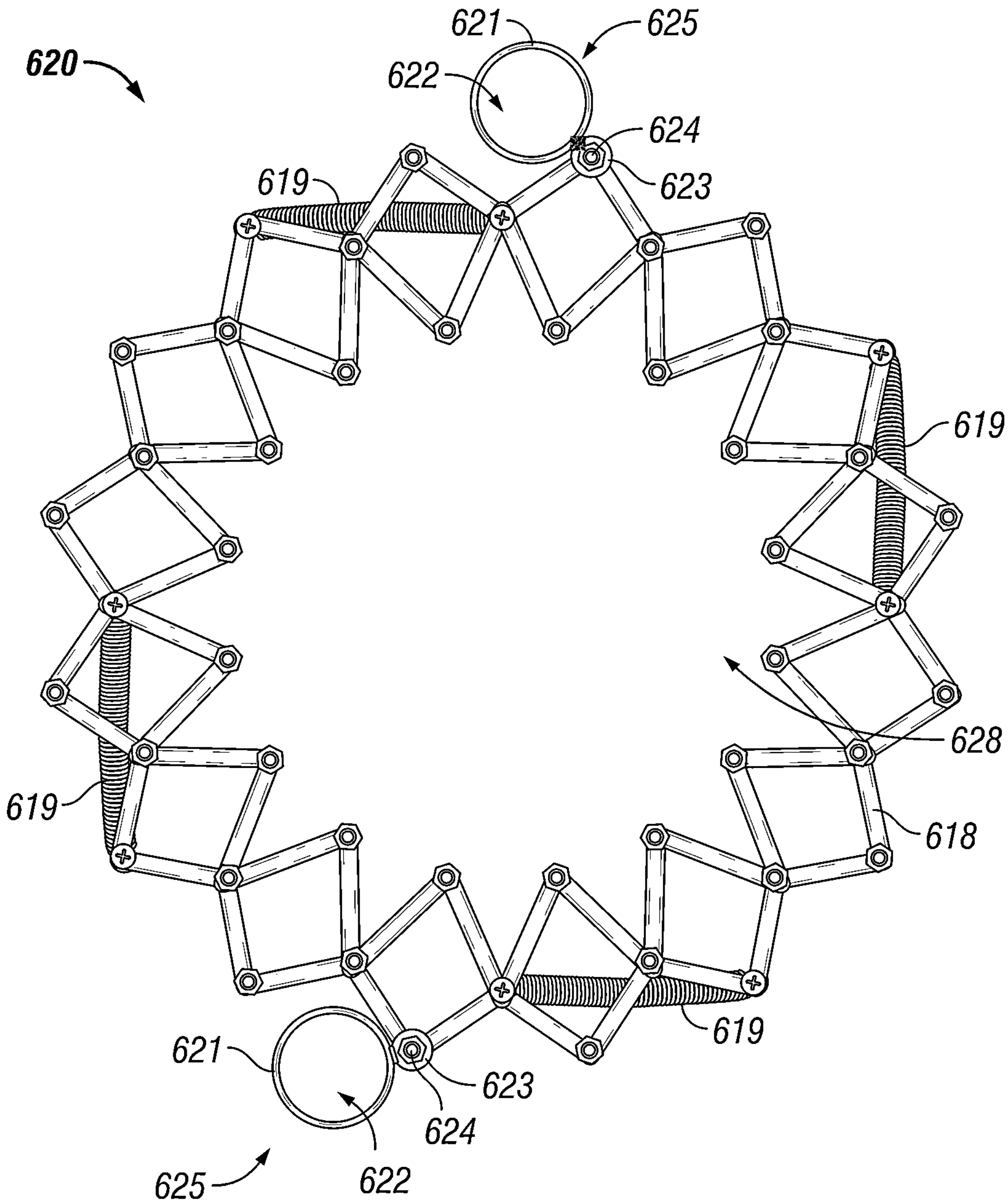
Figure 7:
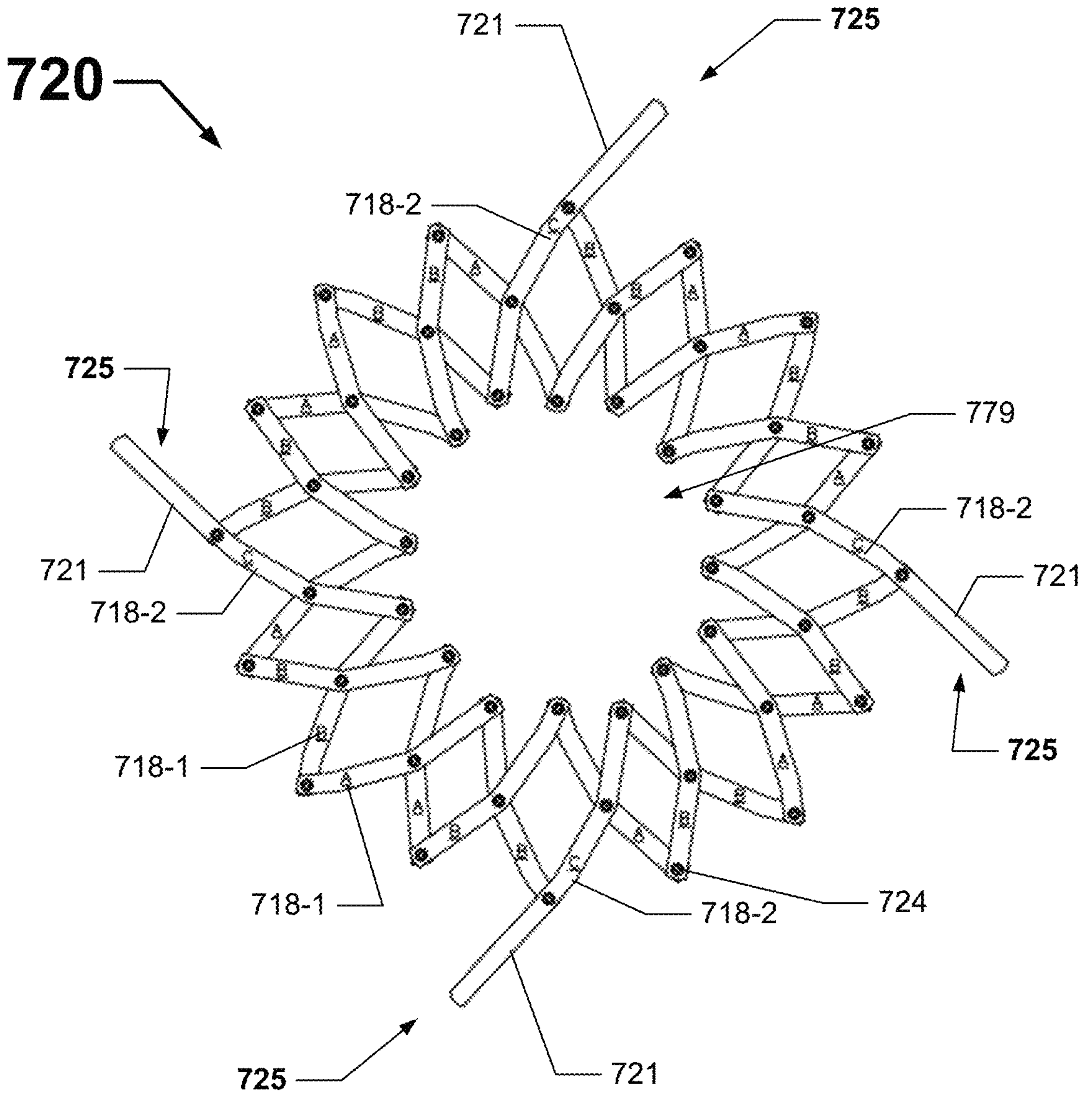
FIG. 7 shows another adjustable securing apparatus of a deluge fire protection system according to certain example embodiments.

FIGS. 6A and 6B show an adjustable securing apparatus 620 of a deluge fire protection system according to certain example embodiments. Specifically, FIG. 6A shows the adjustable securing apparatus 620 in a fully closed position, and FIG. 6B shows the adjustable securing apparatus 620 in a fully open position. Referring to FIGS. 1 through 6B, the adjustable securing apparatus 620 of FIGS. 6A and 6B is a component of a deluge nozzle diversion apparatus (e.g., deluge nozzle diversion apparatus 510) that is separable from the top end (e.g., top end 512) of a collection component (e.g., collection component 515). For example, in this case, the adjustable securing apparatus 620 can be disposed over the top end of a collection component of a deluge nozzle diversion apparatus to secure the top end to a deluge nozzle assembly.

The adjustable securing apparatus 620 of FIGS. 6A and 6B includes multiple components. For example, the adjustable securing apparatus 620 includes multiple (in this case, 32) segments 618 that are movably interconnected with each other. In this case, all of the segments 618 have substantially the same characteristics (e.g., shape, size, material) as each other. Each segment 618 is rotatably coupled to one or more other segments 618 using a coupling feature 624, in this case in the form of a nut and bolt, which allows the two segments 618 to rotate about the coupling feature 624 along a plane defined by the length of each segment 618. In this way, each segment 618 has multiple coupling features in the form of apertures that each receive an independent coupling feature 624. In this example, there are a total of 48 coupling features 624, all in the form of nuts and bolts paired with each other.

Each segment 618 can be linear, non-linear, planar, three-dimensional, and/or have any of a number of other features and characteristics. In this case, each segment 618 is planar and non-linear. When there are multiple segments 618, one segment can have one or more of the same or different characteristics (e.g., length, curvature, thickness, material, location of apertures to receive the coupling features 624) compared to corresponding characteristics of one or more of the other segments 618. In this case, all of the segments 618 have the same characteristics as each other.

When the adjustable securing apparatus 620 is in a fully closed position, as shown in FIG. 6A, the inner perimeter formed by the segments 618 define a minimum area 629 in which a portion of a deluge nozzle assembly (e.g., deluge nozzle assembly 278) and the top end of the collection component of the deluge nozzle diversion apparatus can be disposed. Provided that the outer perimeter of the combination of the widest part of the deluge nozzle assembly (e.g., the housing of the deluge nozzle) and the top end of the collection component of the deluge nozzle diversion apparatus are greater than the minimum area 629, the adjustable securing apparatus 620 can have a closed position that secures the top end of the collection component of the deluge nozzle diversion apparatus to the deluge nozzle assembly (e.g., deluge nozzle assembly 278).

Another component of the adjustable securing apparatus 620 in this case is a resilient device 619. In this case, there are four resilient devices 619 in the form of springs. In alternative cases, there can be any other number (e.g., one, three, seven) of resilient devices 619. Each resilient device 619 has two ends, where each end is coupled to one or more different segments 618. In this case, each end is coupled to two segments 618 by a coupling feature 624. Each resilient device 619 is configured to force the segments 618 to put the adjustable securing apparatus 620 in a normally closed position. If a sufficient outward force is applied to the adjustable securing apparatus 620 to overcome the force applied by the resilient devices 619, then the adjustable securing apparatus 620 can be adjusted to a different closed position to form an area that is larger than the minimum area 629 or to an open position. A resilient device 619 can take on one or more of any of a number of other forms, including but not limited to a rubber band and a ratchet-and-release mechanism.

In alternative embodiments, in the absence of resilient devices 619, an adjustable securing apparatus 620 can include one or more other components and/or features that both allow the adjustable securing apparatus 620 to expand to a sufficiently open position to fit over a deluge nozzle (e.g., deluge nozzle 290) and also securely set in a closed position so that the adjustable securing apparatus 620 remains engaged over the deluge nozzle, even as fire protection fluid is discharged from the deluge nozzle. For example, the adjustable securing apparatus 620 can include one or more clamps that, once engaged, lock the adjustable securing apparatus 620 in a closed position and, when disengaged, allow the adjustable securing apparatus 620 to expand to a fully open position. Such components and/or features (e.g., a clamp, a set screw, a latch, a bracket, a detent) can be integrated with the adjustable securing apparatus 620. In addition, or in the alternative, such components can be independent devices that interact with the adjustable securing apparatus 620.

Yet another component of the adjustable securing apparatus 620 in this case is a receiving feature 625. In this case, there are two receiving features 625 that are each configured to receive an engagement feature of an expansion device designed to apply an amount of outward force that overcomes the force imposed by the resilient devices 619. In alternative embodiments, there can be any other number (e.g., one, three, four, five) of receiving features 625 on the adjustable securing apparatus 620. When there are multiple receiving features 620, one receiving feature 625 can have one or more of the same or different characteristics (e.g., length, curvature, thickness, material, coupling features 623 to receive the coupling features 624) compared to corresponding characteristics of one or more of the other receiving features 625. In this case, all of the receiving features 625 have the same characteristics as each other.

A receiving feature 625 can be positioned at any location on an adjustable securing apparatus 620. For example, in this case, the coupling feature 623 of the receiving features 625 are coupled at the outer perimeter of the adjustable securing apparatus 620 so that the receiving features 625 are positioned beyond the outer perimeter of the adjustable securing apparatus 620. An adjustable securing apparatus 620 with multiple receiving features 625 can be arranged symmetrically, randomly, or in any other manner. In this case, the receiving features 625 are spaced equidistantly from each other around the outer perimeter of the adjustable securing apparatus 620.

Figure 8:
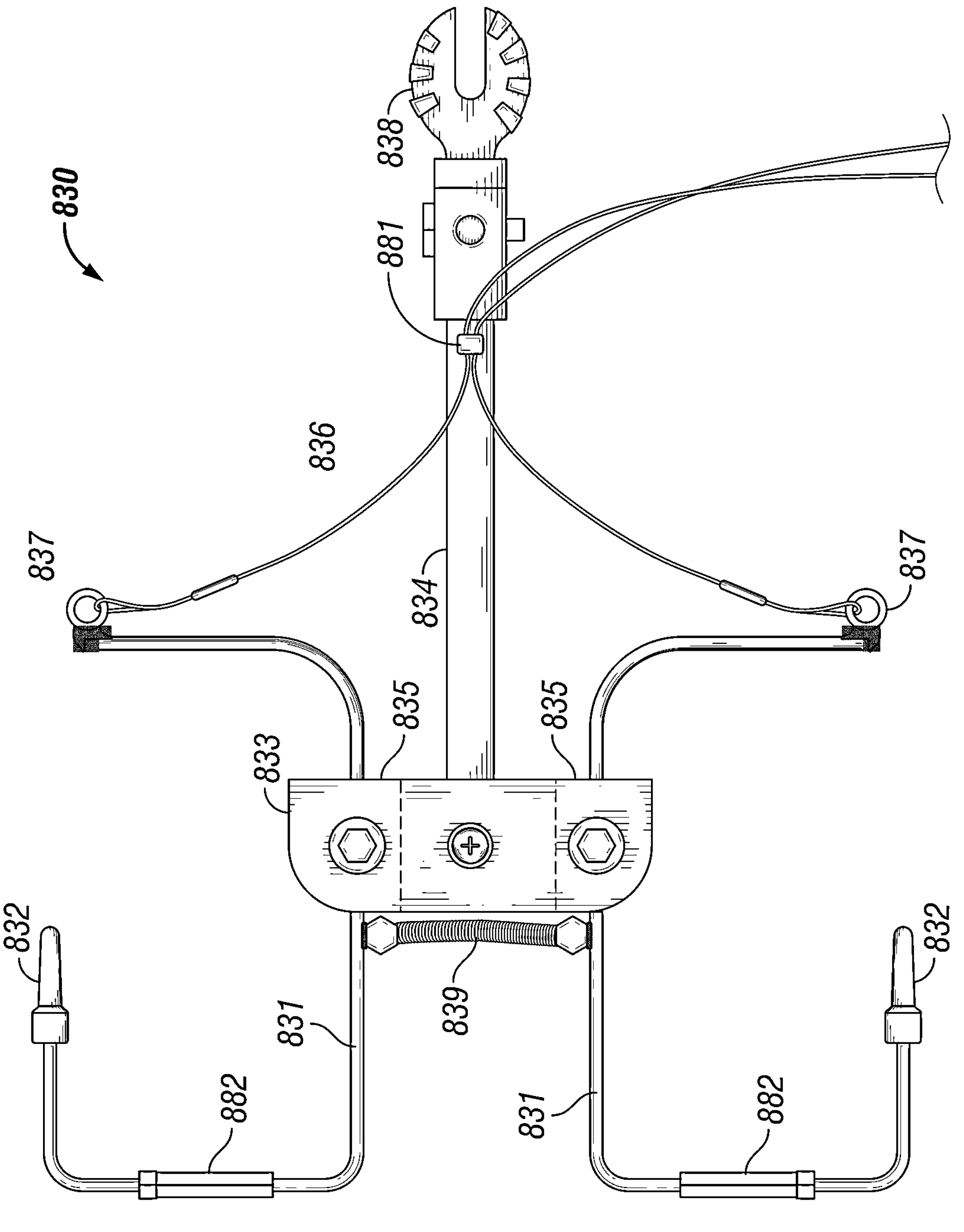
FIG. 8 shows an expansion device according to certain example embodiments.

The receiving features 625 can have any of a number of configurations. For example, in this case, each receiving feature 625 includes a body 621 (in this case, in the form of a ring that forms an aperture 622) that has a coupling feature 623 in the form of an extension with an aperture that traverses therethrough. The coupling feature 623 of each receiving feature 625 is rotatably coupled to one or more segments 618 by a coupling feature 624 along the outer perimeter of the adjustable securing apparatus 620. An example of an expansion device is shown in FIG. 8 below.

The body 621 of each receiving feature 625 (in this case, more specifically, the aperture 622 formed in the body 621 of each receiving feature 625) is configured to receive an engagement feature of the expansion device discussed above, and so the body 621 can have any of a number of other configurations besides a ring that forms an aperture 622. Examples of such other configurations of the body 621 can include, but are not limited to, an extension with no features (as in FIG. 7 below), an extension with a detent, an extension with a slot, an extension with a protrusion, and an extension with an aperture. In some cases, as with the receiving features shown in FIG. 7 below, the coupling feature 623 of a receiving feature 625 is optional or omitted. In some cases, as shown in FIG. 7 below, the receiving features 625 are integrated with one or more segments 618 rather than being separate components.

When the receiving features 625 are engaged by engagement features of an expansion device, and when a radially outward force is applied by the expansion device to the receiving features 625 of the adjustable securing apparatus 620 of sufficient strength to overcome the opposing force applied by the resilient devices 619, the adjustable securing apparatus 620 is opened, starting with other potentially closed positions, then transitioning to increasingly open positions, and culminating in a fully open position, as shown in FIG. 6B. When the radially outward force applied by the expansion device to the receiving features 625 of the adjustable securing apparatus 620 is removed or is no longer of sufficient strength to overcome the opposing force applied by the resilient devices 619, the adjustable securing apparatus 620 reverts to the fully closed position, as shown in FIG. 6A.

When the adjustable securing apparatus 620 is in a fully open position, as shown in FIG. 6A, the inner perimeter formed by the proximal end of the segments 618 define a maximum area 628 in which a deluge nozzle (e.g., deluge nozzle 290) and the top end of the collection component of the deluge nozzle diversion apparatus can be disposed. Provided that the outer perimeter of the combination of the deluge nozzle (e.g., deluge nozzle 290) and the top end of the collection component of the deluge nozzle diversion apparatus are less than the maximum area 628, the adjustable securing apparatus 620 can pass over the deluge nozzle in order to put the deluge nozzle in the collection cavity of the deluge nozzle diversion apparatus (before testing the deluge system) or in order to remove the deluge nozzle diversion apparatus (after testing the deluge system).

FIG. 7 shows another adjustable securing apparatus 720 of a deluge fire protection system according to certain example embodiments. Referring to FIGS. 1 through 7, the adjustable securing apparatus 720 of FIG. 7 is a component of a deluge nozzle diversion apparatus (e.g., deluge nozzle diversion apparatus 510) that is separable from the top end (e.g., top end 512) of a collection component (e.g., collection component 515). For example, in this case, the adjustable securing apparatus 720 can be disposed over the top end of a collection component of a deluge nozzle diversion apparatus in order to secure the top end to a deluge nozzle assembly.

The adjustable securing apparatus 720 of FIG. 7 includes multiple components. For example, the adjustable securing apparatus 720 includes multiple (in this case, 28) segments 718-1 (substantially similar to the segments 618 of FIGS. 6A and 6B above) and multiple (in this case, 4) segments 718-2 (substantially similar to the segments 718-1, but with extensions in the form of receiving features 725 at their distal ends) that are movably interconnected with each other. The segments 718-1 and the segments 718-2 can sometimes collectively be referred to as the segments 718 herein.

In this case, the 28 segments 718-1 in this example have substantially the same characteristics (e.g., shape, size, length, material) as each other. Each segment 718 is rotatably coupled to one or more other segments 718 using a coupling feature 724 (substantially similar to the coupling features 624 of FIGS. 6A and 6B), in this case in the form of a nut and bolt, which allows the two segments 718 to rotate about the coupling feature 724 along a plane defined by the length of each segment 718. In this way, each segment 718 has multiple coupling features in the form of apertures that each receive an independent coupling feature 724. In this example, there are a total of 48 coupling features 724, all in the form of nuts and bolts paired with each other.

In this case, each segment 718 is planar and non-linear. As discussed above, the four segments 718-2 are longer than the rest of the other segments 718. These four segments 718-2 are configured identically relative to each other and spaced equidistantly around the adjustable securing apparatus 720. Further, each of these four segments 718-2 includes an extension having a body 721 that serves as a receiving feature 725. The adjustable securing apparatus 720, as shown in FIG. 7, is in a position between fully closed and fully open, and so the inner perimeter formed by the proximal end of the segments 718 define an area 779 in which a portion of a deluge nozzle assembly (e.g., deluge nozzle assembly 278) and the top end of the collection component of the deluge nozzle diversion apparatus can be disposed.

Each of the four receiving features 725 (substantially similar to the receiving features 625 of FIGS. 6A and 6B above) is configured to receive an engagement feature of an expansion device designed to apply an amount of outward force to move the adjustable securing apparatus 720 toward the fully open position and/or to apply an amount of inward force to move the adjustable securing apparatus 720 toward the fully closed position.

The adjustable securing apparatus 720 in this case has no resilient devices (e.g., resilient device 619 of FIGS. 6A and 6B above), but alternative embodiments can include one or more resilient devices. In this case, the adjustable securing apparatus 720 can include alternative features (e.g., one or more clamps, one or more detents) that maintain the adjustable securing apparatus 720 in a closed position when the adjustable securing apparatus 720 is securing the top end of the collection component of a deluge nozzle diversion apparatus to a portion of a deluge nozzle assembly. Alternatively, such features can be independent of the adjustable securing apparatus 720 and interact with the adjustable securing apparatus 720 to hold the adjustable securing apparatus 720 in a sufficiently closed position.

As discussed above, an adjustable securing apparatus (e.g., the adjustable securing apparatus 620 of FIGS. 6A and 6B, the adjustable securing apparatus 720 of FIG. 7) can be moved toward the fully open position (and in some cases also toward the fully closed position) by engaging one or more engagement features of an expansion device with one or more receiving features (e.g., receiving features 625, receiving features 725) of the adjustable securing apparatus. An expansion device and its engagement features can take any of a number of forms. For example, an expansion device can be a person, and the engagement features can be one or both hands of the person. As another example, an expansion device can be a mechanical device, as shown in FIG. 8 below. An expansion device can be a mechanical device when, for example, the deluge valve assembly is in a difficult place (high above the ground, over bulky and immovable equipment) for a person to reach without assistance or when a significant force is required to change the position (e.g., more open) of the adjustable securing apparatus.

FIG. 8 shows an expansion device 830 according to certain example embodiments. Referring to FIGS. 1 through 8, the expansion device 830 of FIG. 8 can be used with a number of differently configured adjustable securing apparatus. In this example, the expansion device 830 of FIG. 8 is described as being used with the adjustable securing apparatus 620 of FIGS. 6A and 6B. The purpose of the expansion device 830 is to open an adjustable securing apparatus sufficiently to move the adjustable securing apparatus past a deluge nozzle (e.g., deluge nozzle 290) and/or to close the adjustable securing apparatus over a deluge nozzle assembly so that the deluge nozzle is securely positioned within the collection cavity (e.g., collection cavity 511) of the adjustable securing apparatus. The expansion device 830 can include one or more of a number of components and/or have one or more of a number of configurations. The configuration of the expansion device 830 is based on the configuration of an adjustable securing apparatus.

In this example, the expansion device 830 includes a body 833, two arms 831, a shaft 834, two control lines 836, a resilient device 839, and an optional mounting feature 838. Each of the two arms 831 is C-shaped and is movably disposed within a slot 835 in the body 833 so that movement of one arm 831 moves that arm closer to or further away from the other arm 831. The arms 831 are oriented symmetrically with respect to each other, so that the C-shape of one arm 831 is a mirror image of the other arm 831, as shown in FIG. 8. In alternative embodiments, the expansion device 830 can have more than two arms 831. In addition, or in the alternative, each arm 831 can have multiple engagement features 832.

Each arm 831 can have one or more adjustment features 882 that can extend, contract, rotate, or otherwise manipulate the arm 831 (or portion thereof) to change the relative position of the engagement feature 832 disposed at its distal end. In certain example embodiments, the plane defined by an arm 831 can be antiparallel to the plane defined by the body 833 of the expansion device 830. In certain example embodiments, resilient device 839, in this case in the form of a compression spring, is disposed between and coupled to the two arms 831 (where the portions of the arms 831 are parallel to each other) adjacent to the body 833. The resilient device 839, when in its natural state, keeps the distance between the two arms 831 at a maximum (i.e., to the outer end of the slots 835 in the body 833).

Each arm 831 has extending away therefrom at its distal end an engagement feature 832, similar to the engagement features discussed above with respect to FIGS. 6A through 7. Each engagement feature 832 can include one or more characteristics (e.g., types of material, tapering, protrusions, outer surface features). Further, each engagement feature 832 is configured, based in part on these characteristics, to be positioned within the aperture 622 formed by the body 621 of a receiving feature 625 of the adjustable securing apparatus 620. In order to position the engagement features 832 close enough to each other to engage the receiving features 625 (in this case, be disposed within the apertures 622), one or both of the control lines 836 can be pulled. The distal end of each control line 836 is coupled to a coupling feature 837 (in this case, in the form of an O-shaped ring) disposed at the proximal end of the arms 831 (on the portions of the arms 831 that are substantially linearly aligned with each other).

The control lines 836 can also be channeled through a guide 881, disposed on the shaft 834, to ensure proper alignment of the control lines 836 relative to the body 833 and the arms 831 within the slots 835 in the body 833. The distal end of the shaft 834 is coupled to the body 833 between the slots 835. When the control lines 836 are pulled with enough force to overcome the opposing force applied to the arms 831 by the resilient device 839, then the distance between the arms 831 is decreased. At some point, the distance between the arms 831 can be small enough to allow the engagement features 832, when properly positioned relative to the receiving features 625 of the adjustable securing apparatus 620, to slide within the apertures 622 when the force pulling the control lines 836 is decreased so that the distance between the engagement features 832 increases. The control lines 836 can have any length that is needed based on any of a number of factors, including but not limited to the distance to the adjustable securing apparatus 620.

The mounting feature 838 disposed at the proximal end of the shaft 834 can be used to engage (e.g., couple to) an auxiliary device (e.g., a pole) when an extension is needed to reach the adjustable securing apparatus 620. The mounting feature 838 can have one or more features that allow for the angle between the auxiliary device and the expansion device 830 to be adjusted. In some cases, when the mounting feature 838 is not included with the expansion device 830, the shaft 834 can be of any suitable length to substitute for the auxiliary device. In some cases, the shaft 834 of the expansion device 830 and/or the auxiliary device can have an expandable length.

In certain example embodiments, if the adjustable securing apparatus manipulated by the expansion device 830 does not have any resilient devices (e.g., resilient devices 619), then the expansion device 830 can be configured to engage/disengage one or more other components (e.g., a clamp) that can be used to control when the adjustable securing apparatus can be opened and closed, thereby controlling when the adjustable securing apparatus can be engaged with and disengaged from a deluge nozzle assembly.

Figure 9:
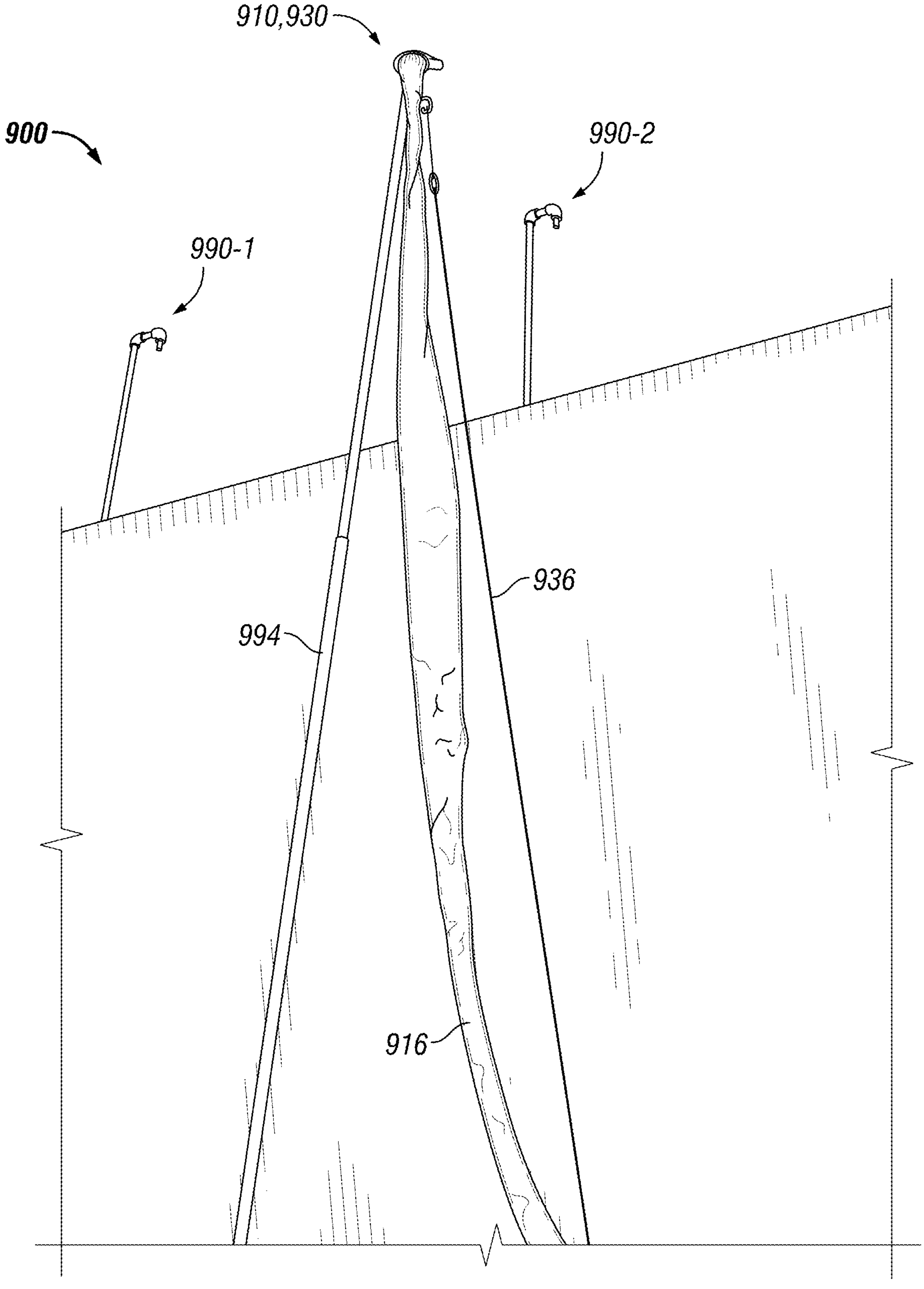
FIG. 9 shows a system that includes an adjustable securing apparatus and an expansion device according to certain example embodiments.

FIG. 9 shows a system 900 that includes an adjustable securing apparatus 910 and an expansion device 930 according to certain example embodiments. Referring to FIGS. 1 through 9, the system 900 includes two deluge nozzles 990 (deluge nozzle 990-1 and deluge nozzle 990-2) that are positioned at a high elevation. As a result, in order to safely cover a deluge nozzle 990 (e.g., deluge nozzle 990-2), an expansion device 930, disposed at the distal end of an extension pole 994 (a form of auxiliary device), is used. The extension pole 994 eliminates the need for a ladder, a lift truck, or some other device to allow a user to get close enough to manually engage or disengage the adjustable securing apparatus 910 with respect to the deluge nozzle 990-2.

The expansion device 930 of the system 900 of FIG. 9 can be substantially the same as the expansion device 830 of FIG. 8. The extension pole 994 is extended in FIG. 9 so that the adjustable securing apparatus 910, with the aid of the expansion device 930 controlled using the control line 936, can be placed over the deluge nozzle 990-2 prior to testing the deluge nozzle 990-2. Once the adjustable securing apparatus 910 is secured over the deluge nozzle 990-2, the fire protection fluid discharged from the deluge nozzle 990-2 is diverted through the diversion channel 916 to a location away from the equipment (e.g., equipment 270) located within the range of coverage (e.g., range of coverage 295) of the deluge nozzle 990-2.

Example embodiments can be used for diverting fire protection fluid of deluge fire protection systems. Example embodiments can be used in land-based or offshore field operations. Example embodiments can be used during testing of a deluge fire protection system to avoid harmful effects that fire protection fluid can have on equipment located within a range of coverage of a deluge nozzle. Example embodiments can provide a number of benefits. Such other benefits can include, but are not limited to, ease of use, reusability, time savings, and compliance with applicable industry standards and regulations for deluge fire protection systems.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A system comprising:

a deluge nozzle assembly comprising a deluge nozzle and a pipe of a plurality of pipes, wherein the deluge nozzle has an opening;

a fire protection fluid;

a pumping system that pumps the fire protection fluid through the plurality of pipes and the opening in the deluge nozzle; and a deluge nozzle diversion apparatus disposed over the deluge nozzle during testing of the deluge nozzle, wherein the deluge nozzle diversion apparatus comprises:

a collection component comprising at least one wall that forms a collection cavity, wherein the collection component has a first end and a second end that is opposite the first end, wherein the deluge nozzle is disposed within the collection cavity, wherein the at least one wall of the collection component is flexible so that the at least one wall has an altered shape that is configurable to enclose a deluge nozzle of a deluge system, and wherein the collection cavity of the collection component receives substantially all of the fire protection fluid discharged from the deluge nozzle;

an adjustable securing apparatus that secures the first end of the collection component to the deluge nozzle assembly, wherein the adjustable securing apparatus, when in the closed position, is configured to contribute to the altered shape of the at least one wall of the collection component by securing the first end of the collection component over the pipe that feeds the deluge nozzle of the deluge nozzle assembly, and wherein the adjustable securing apparatus, when in the closed position, is configured to remain secured over the pipe during testing of the deluge system so that the deluge nozzle remains within the collection cavity as the fire protection fluid flows out of the deluge nozzle; and a diversion channel connected to the second end of the collection component, wherein the diversion channel is adjustable and has a length sufficient to divert the fire protection fluid flowing therethrough to an alternative location; and an expansion device that engages a receiving feature disposed on the adjustable securing apparatus to put the adjustable securing apparatus in an open position, wherein the expansion device is disposed at a distal end of a pole.

2. The system of claim 1, wherein the adjustable securing apparatus is disposed over an outer surface of the first end of the collection component.

3. The system of claim 1, wherein the fire protection fluid comprises a corrosive component.

4. The system of claim 3, wherein the corrosive component comprises salt, and wherein the fire protection fluid is sea water.

5. The system of claim 1, further comprising:

equipment disposed within a spray zone of the deluge nozzle in the absence of the deluge nozzle diversion apparatus, wherein the equipment is subject to malfunction when deluged by the fire protection fluid.

6. The system of claim 5, wherein the equipment and the deluge nozzle are located on an offshore platform, and wherein the alternative location is off the offshore platform.

7. The system of claim 6, wherein the fire protection fluid is drawn from a body of water in which the offshore platform is disposed.

8. The system of claim 1, wherein the adjustable securing apparatus, when in a closed position around the first end of the collection component of the deluge nozzle diversion apparatus, secures the collection component around the deluge nozzle when the fire protection fluid flows therethrough without external assistance.

* * * * *